United States Patent
Zhou

(10) Patent No.: US 12,353,634 B2
(45) Date of Patent: Jul. 8, 2025

(54) GESTURE ANALYSIS METHOD AND DEVICE, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Yang Zhou, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 627 days.

(21) Appl. No.: 17/746,956

(22) Filed: May 17, 2022

(65) Prior Publication Data

US 2022/0351547 A1    Nov. 3, 2022

Related U.S. Application Data

(63) Continuation of application No. PCT/CN2020/128469, filed on Nov. 12, 2020.
(Continued)

(51) Int. Cl.
| | |
|---|---|
| G06V 40/20 | (2022.01) |
| G06F 3/01 | (2006.01) |
| G06T 7/50 | (2017.01) |

(52) U.S. Cl.
CPC .............. *G06F 3/017* (2013.01); *G06T 7/50* (2017.01); *G06V 40/28* (2022.01)

(58) Field of Classification Search
CPC .......... G06F 3/017; G06T 7/50; G06V 40/28; G06V 10/454; G06V 20/64; G06V 10/82; G06V 40/113
See application file for complete search history.

(56) References Cited

U.S. PATENT DOCUMENTS 11,163,373 B2 * 11/2021 Liu ....................... G06V 20/64
2018/0373927 A1    12/2018 Yang et al.

FOREIGN PATENT DOCUMENTS

| CN | 106127204 A | * 11/2016 | .......... G06K 9/3258 |
| CN | 107423698 | 12/2017 | |

(Continued)

OTHER PUBLICATIONS

Tomas, "Hand Keypoint Detection in Single Images using Multiview Bootstrapping", Proceedings of the IEEE conference on Computer Vision and Pattern Recognition, pub. 2017. (Year: 2017).*

(Continued)

*Primary Examiner* — Mekonen T Bekele
(74) *Attorney, Agent, or Firm* — Hodgson Russ LLP

(57) ABSTRACT

A gesture analysis method and a device and a non-transitory computer-readable storage medium are provided. The method includes: performing a feature extraction process on an image, and obtaining a first amount of features of finger key points and a second amount of features of palm key points; performing a UV-coordinate regression process and a depth regression process on each of the features of the finger key points and the palm key points, and obtaining a first UV coordinate and a first depth coordinate of each of the finger key points, and a second UV coordinate and a second depth coordinate of each of the palm key points; and performing a gesture analysis on the image according to the first UV coordinate, and the first depth coordinate, the second UV coordinate, and the second depth coordinate, and obtaining a gesture analysis result.

18 Claims, 15 Drawing Sheets

Related U.S. Application Data

(60) Provisional application No. 62/938,189, filed on Nov. 20, 2019.

(56) References Cited

FOREIGN PATENT DOCUMENTS

| | | | | |
|---|---|---|---|---|
| CN | 109657537 | | 4/2019 | |
| CN | 109800676 | | 5/2019 | |
| CN | 109800676 A | * | 5/2019 | |
| CN | 109858524 | | 6/2019 | |
| CN | 109858524 A | * | 6/2019 | ............. G06F 3/017 |
| WO | 2017164979 | | 9/2017 | |

OTHER PUBLICATIONS

Tomas Simon et al., "Hand Keypoint Detection in Single Images using Multiview Bootstrapping", Proceedings of the IEEE conference on Computer Vision and Pattern Recognition, pub. 2017 (Year: 2017).*

WIPO, International Search Report and Written Opinion for PCT/CN2020/128469, Jan. 22, 2021.

Ding et al., "A Gesture recognition method based on deep learning," Control and Information Technology, No. 6, 2018.

\* cited by examiner

GESTURE ANALYSIS METHOD AND DEVICE, AND COMPUTER-READABLE STORAGE MEDIUM

CROSS-REFERENCE TO RELATED APPLICATIONS

The present disclosure is a continuation of International Patent Application No. PCT/CN2020/128469, filed Nov. 12, 2020, which claims priority to U.S. Provisional Patent Application No. 62/938,189, filed Nov. 20, 2019, the entire disclosures of which are incorporated herein by reference.

TECHNICAL FIELD

The present disclosure relates to the field of Internet technologies, and in particular, to a method and a device for gesture analysis, and a non-transitory computer-readable storage medium.

BACKGROUND

Gesture recognition and gesture analysis technologies are applied in many fields. Purpose of the gesture recognition and gesture analysis technologies is to estimate coordinates of several joint points of a hand by analyzing an image. It is expected to obtain exciting new applications in immersive virtual reality and augmented reality, robot control and sign language recognition, because motion of human hand can be reconstructed accurately and effectively based on image.

In recent years, especially with advent of consumer depth cameras, these applications have made great progress. However, due to unconstrained global and local pose changes, frequent occlusion, local self similarity and high strength joint motion, gesture analysis is still a difficult task, and accuracy of gesture analysis methods in related technologies needs to be improved.

SUMMARY

The embodiment of the present disclosure provides a method and a device for gesture analysis, and a non-transitory computer-readable storage medium to separate gesture estimation tasks of finger and palm. In a separated architecture, finger key points and palm key points are processed respectively to realize gesture analysis of the whole hand. In this way, accuracy of gesture analysis can be greatly improved.

Technical schemes of some embodiments of the present disclosure are realized as follows.

Some embodiments of the present disclosure provide a gesture analysis method, including: performing a feature extraction process on an image, and obtaining a first amount of features of finger key points and a second amount of features of palm key points; performing a UV-coordinate regression process on each of the features of the finger key points and each of the features of the palm key points respectively, and correspondingly obtaining a first UV coordinate of each of the finger key points and a second UV coordinate of each of the palm key points respectively; performing a depth regression process on each of the features of the finger key points and each of the features of the palm key points respectively, and correspondingly obtaining a first depth coordinate of each of the finger key points and a second depth coordinate of each of the palm key points respectively; and performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result.

Some embodiments of the present disclosure provide a gesture analysis device, including a memory for storing executable instructions, and a processor, that, when executing the executable instructions stored in the memory, is caused to perform: performing a feature extraction process on an image, and obtaining a first amount of features of finger key points and a second amount of features of palm key points; performing a UV-coordinate regression process on each of the features of the finger key points and each of the features of the palm key points respectively, and correspondingly obtaining a first UV coordinate of each of the finger key points and a second UV coordinate of each of the palm key points respectively; performing a depth regression process on each of the features of the finger key points and each of the features of the palm key points respectively, and correspondingly obtaining a first depth coordinate of each of the finger key points and a second depth coordinate of each of the palm key points respectively; and performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result Some embodiments of the present disclosure provide a non-transitory computer-readable storage medium storing executable instructions that when executed cause a processor to perform: performing a feature extraction process on an image, and obtaining a first amount of features of finger key points and a second amount of features of palm key points; performing a UV-coordinate regression process on each of the features of the finger key points and each of the features of the palm key points respectively, and correspondingly obtaining a first UV coordinate of each of the finger key points and a second UV coordinate of each of the palm key points respectively; performing a depth regression process on each of the features of the finger key points and each of the features of the palm key points respectively, and correspondingly obtaining a first depth coordinate of each of the finger key points and a second depth coordinate of each of the palm key points respectively; and performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result.

DETAILED DESCRIPTION OF THE PREFERRED EMBODIMENTS

Figure 1:
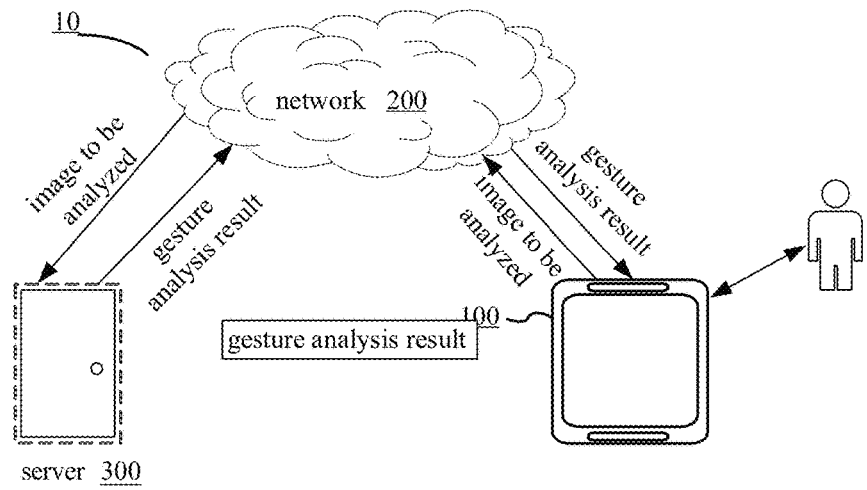
FIG. 1 is an alternative architecture diagram of a gesture analysis system provided by some embodiments of the present disclosure.

In order to make the purpose, technical scheme and advantages of the present disclosure clearer, the present disclosure will be described more fully below with reference to the relevant drawings and embodiments. The described embodiments shall not be regarded as limiting the present disclosure. All other embodiments obtained by ordinary technicians in the art without making creative work belong to the protection scope of the invention.

In the following description, reference is made to "some embodiments", which describe a subset of all possible embodiments, but it is understood that "some embodiments" can be same or different subsets of all possible embodiments and can be combined with each other without conflict. Unless otherwise defined, all technical and scientific terms used in the embodiments of the present disclosure have the same meanings as those generally understood by those skilled in the art of the embodiments of the present disclosure. The terms used in the embodiments of the present disclosure are only for the purpose of describing the embodiments of the present disclosure and are not intended to limit the present disclosure.

In some embodiments, a gesture analysis method is provided. The method includes: performing a feature extraction process on an image, and obtaining a first amount of features of finger key points and a second amount of features of palm key points; performing a UV-coordinate regression process on each of the features of the finger key points and each of the features of the palm key points respectively, and correspondingly obtaining a first UV coordinate of each of the finger key points and a second UV coordinate of each of the palm key points respectively; performing a depth regression process on each of the features of the finger key points and each of the features of the palm key points respectively, and correspondingly obtaining a first depth coordinate of each of the finger key points and a second depth coordinate of each of the palm key points respectively; and performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result.

Alternatively, the performing a UV-coordinate regression process on each of the features of the finger key points and each of the features of the palm key points respectively and correspondingly obtaining a first UV coordinate of each of the finger key points and a second UV coordinate of each of the palm key points, includes: performing a UV coding process on each of the features of the finger key points and each of the features of the palm key points respectively, and correspondingly obtaining a first UV coding feature of each of the finger key points and a second UV coding feature of each of the palm key points respectively; and performing a full connection process on the first UV coding feature of each of the finger key points and the second UV coding feature of each of the palm key points respectively, and correspondingly obtaining a first UV coordinate of each of the finger key points and a second UV coordinate of each of the palm key points.

Alternatively, the performing a UV coding process on each of the features of the finger key points, and obtaining a first UV coding feature of each of the finger key points, includes: performing a convoluting process on each of the features of the finger key points by a first convolution layer, and obtaining a first convolution feature of each of the finger key points; successively performing skip connection processes on the first convolution feature of each of the finger key points for a first preset amount of times by the first convolution layer, and obtaining a first skip connection feature of each of the finger key points; and performing a pooling process on the first skip connection feature of each of the finger key points, reducing a spatial size of the first skip connection feature thereof, and obtaining the first UV coding feature of each of the finger key points.

Alternatively, the successively performing skip connection processes on the first convolution feature of each of the finger key points for a first preset amount of times by the first convolution layer, and obtaining a first skip connection feature of each of the finger key points, includes: determining the first convolution feature as an input feature of the first convolution layer in a first skip connection process; and determining an output feature of the first convolution layer at a N-th time as an input feature of the first convolution layer at a (N+1)-th skip connection process, wherein N is an integer greater than 1; and inputting the input feature determined at each time into the first convolution layer, and successively performing the skip connection processes for the first preset amount of times, and obtaining the first skip connection feature.

Alternatively, the performing a UV coding process on each of the features of the palm key points, and obtaining a second UV coding feature of each of the palm key points, includes: performing a convoluting process on each of the features of the palm key points by a second convolution layer, and obtaining a second convolution feature of each of the palm key points; successively performing skip connection processes on the second convolution feature of each of the palm key points for a second preset amount of times by the second convolution layer, and obtaining a second skip connection feature of each of the palm key points; performing a pooling process the second skip connection feature of each of the palm key points, reducing a spatial size of the second skip connection feature thereof, and obtaining the second UV coding feature of each of the palm key points.

Alternatively, the performing a depth regression process on each of the features of the finger key points and each of the features of the palm key points respectively, and correspondingly obtaining a first depth coordinate of each of the finger key points and a second depth coordinate of each of the palm key points respectively, includes: performing a depth coding process on each of the features of the finger key points and each of the features of the palm key points respectively, obtaining a first depth coding feature of each of the finger key points and a second depth coding feature of each of the palm key points; and performing a full connection process on the first depth coding feature of each of the finger key points and the second depth coding feature of each of the palm key points respectively, and obtaining the first depth coordinate of each of the finger key points and the second depth coordinate of each of the palm key points.

Alternatively, the performing a depth coding process on each of the features of the each of the finger key points point, obtaining a first depth coding feature of each of the finger key points, comprises: performing a convoluting process on each of the features of the finger key points by a third convolution layer, and obtaining a third convolution feature of each of the finger key points; performing skip connection processes on the third convolution feature of each of the finger key points for a third preset amount of times by the third convolution layer, and obtaining a third skip connection feature of each of the finger key points; and performing a pooling process on the third skip connection feature of each of the finger key points, reducing a spatial size of the third skip connection feature thereof, and obtaining the first depth coding feature of each of the finger key points.

Alternatively, the performing a pooling process on the third skip connection feature of each of the finger key points, reducing a spatial size of the third skip connection feature thereof, and obtaining the first depth coding feature of each of the finger key points, includes: determining the third convolution feature as an input feature of the third convolution layer in a first skip connection process; determining an output feature of the third convolution layer at a M-th time as an input feature of the third convolution layer at a (M+1)-th skip connection process, wherein M is an integer greater than 1; and inputting the input feature determined at each time into the third convolution layer, and successively performing the skip connection processes for the third preset amount of times, and obtaining the third skip connection feature.

Alternatively, the performing a depth coding process on each of the features of the palm key points respectively, obtaining a second depth coding feature of each of the palm key points, includes: performing a convoluting process on each of the features of the palm key points by a fourth convolution layer, and obtaining a fourth convolution feature of each of the palm key points; performing skip connection processes on the fourth convolution feature of each of the palm key points for a fourth preset amount of times by the fourth convolution layer, and obtaining a fourth skip connection feature of each of the palm key points; and performing a pooling process on the fourth skip connection feature of each of the palm key points, reducing a spatial size of the fourth skip connection feature thereof, and obtaining the second depth coding feature of each of the palm key points.

Alternatively, the performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result, includes: performing a coordinate conversion on the first UV coordinate and the first depth coordinate of each of the finger key points, and obtaining a first spatial coordinate of a corresponding one of the finger key points; performing another coordinate conversion on the second UV coordinate and the second depth coordinate of each of the palm key points, and obtaining a second spatial coordinate of a corresponding one of the palm key points; and performing the gesture analysis on the image according to the first spatial coordinate of each of the finger key points and the second spatial coordinate of each of the palm key points, and obtaining the gesture analysis result.

Alternatively, the performing the gesture analysis on the image according to the first spatial coordinate of each of the finger key points and the second spatial coordinate of each of the palm key points, and obtaining the gesture analysis result, includes: determining a first relative positional relationship between every two of the finger key points and a second relative positional relationship between every two of the palm key points; successively connecting the first amount of the finger key points and the second amount of the palm key points according to the first relative positional relationship between every two of the finger key points and the second relative positional relationship between every two of the palm key points, and forming a hand key-point connection diagram; and performing the gesture analysis on the image according to the hand key-point connection diagram, and obtaining the gesture analysis result.

Alternatively, the performing a feature extraction process on an image, and obtaining a first amount of features of finger key points and a second amount of features of palm key points, includes: performing a target recognition process on the image, and recognizing a target sub-region with a target object in at least two sub-regions of the image; cutting the target sub-region, and obtaining a cut image; and performing the feature extraction process on the cut image, and obtaining the first amount of the features of the finger key points and the second amount of the features of the palm key points.

Alternatively, the performing a target recognition process on the image, and recognizing a target sub-region with a target object in at least two sub-regions of the image, includes: acquiring a scanning frame with a preset size, wherein a size of the image is greater than the preset size; sliding the scanning frame on the image, and determining a probability value that each of the sub-regions has the target object existing therein; and determining a sub-region with a highest probability value as the target sub-region.

Alternatively, the performing the feature extraction process on the cut image, and obtaining the first amount of the features of the finger key points and the second amount of the features of the palm key points, includes: performing a RoI matching feature extraction on the cut image, and obtaining at least two image RoI matching features on pixel points whose coordinate are floating-point numbers; determining a RoI matching feature diagram according to the at least two image RoI matching features; and performing a two-dimensional hand pose estimation on the RoI matching feature diagram, and determining the first amount of the features of the finger key points and the second amount of the features of the palm key points.

Alternatively, the performing a two-dimensional hand pose estimation on the RoI matching feature diagram, and determining the first amount of the features of the finger key points and the second amount of the features of the palm key points, includes: performing a convoluting process on the image RoI matching features of the RoI matching feature diagram by a fifth convolution layer, and obtaining RoI matching convolution features; performing skip connection processes on the RoI matching convolution features by a sixth convolution layer for a fifth preset amount of times, and obtaining fifth skip connection features; and performing a pooling process on the fifth skip connection features, reducing a spatial size of the fifth skip connection features, and determining the first amount of the features of the finger key points and the second amount of the features of the palm key points.

Alternatively, the method further includes: performing the feature extraction process, the UV-coordinate regression process, the depth regression process and the gesture analysis by a gesture analysis model, and obtaining the gesture analysis result.

Alternatively, the gesture analysis model is trained by steps as follows: inputting a sample image into the gesture analysis model; performing a feature extraction process on the sample image by a hand-feature extraction network of the gesture analysis model, and obtaining a third amount of features of sample first key points and a fourth amount of features of sample second key points; performing a UV-coordinate regression process on each of the features of sample first key points and each of the features of sample second key points respectively by a UV-coordinate regression network of the gesture analysis model, and obtaining a first sample UV coordinate of each of sample finger key points and a second sample UV coordinate of each of sample palm key points; performing a depth regression process on each of the features of sample first key points and each of the features of sample second key points respectively by a depth regression network of the gesture analysis model, and obtaining a first sample depth coordinate of each of the sample finger key points and a second sample depth coordinate of each of the sample palm key points; performing the gesture analysis on the first sample UV coordinate of each of sample finger key points, the second sample UV coordinate of each of sample palm key points, the first sample depth coordinate of each of the sample finger key points and the second sample depth coordinate of each of the sample palm key points by a gesture analysis network of the gesture analysis model, and obtaining a sample gesture analysis results; inputting the sample gesture analysis result into a preset loss model, and obtaining a loss result; and modifying parameters of the hand-feature extraction network, the UV-coordinate regression network, the depth regression network and the gesture analysis network according to the loss result, and modifying the gesture analysis model.

In some embodiments, a gesture analysis device is provided. The gesture analysis device includes a memory for storing executable instructions, and a processor, that, when executing the executable instructions stored in the memory, is caused to perform: performing a feature extraction process on an image, and obtaining a first amount of features of finger key points and a second amount of features of palm key points; performing a UV-coordinate regression process on each of the features of the finger key points and each of the features of the palm key points respectively, and correspondingly obtaining a first UV coordinate of each of the finger key points and a second UV coordinate of each of the palm key points respectively; performing a depth regression process on each of the features of the finger key points and each of the features of the palm key points respectively, and correspondingly obtaining a first depth coordinate of each of the finger key points and a second depth coordinate of each of the palm key points respectively; and performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result.

Alternatively, in the performing a UV-coordinate regression process on each of the features of the finger key points and each of the features of the palm key points respectively and correspondingly obtaining a first UV coordinate of each of the finger key points and a second UV coordinate of each of the palm key points, the processor is caused to perform: performing a UV coding process on each of the features of the finger key points and each of the features of the palm key points respectively, and correspondingly obtaining a first UV coding feature of each of the finger key points and a second UV coding feature of each of the palm key points respectively; and performing a full connection process on the first UV coding feature of each of the finger key points and the second UV coding feature of each of the palm key points respectively, and correspondingly obtaining a first UV coordinate of each of the finger key points and a second UV coordinate of each of the palm key points.

In some embodiments, a non-transitory computer-readable storage medium is provided. The non-transitory computer-readable storage medium is configured to store executable instructions that when executed, causes a processor to execute the executable instructions to perform: performing a feature extraction process on an image, and obtaining a first amount of features of finger key points and a second amount of features of palm key points; performing a UV-coordinate regression process on each of the features of the finger key points and each of the features of the palm key points respectively, and correspondingly obtaining a first UV coordinate of each of the finger key points and a second UV coordinate of each of the palm key points respectively; performing a depth regression process on each of the features of the finger key points and each of the features of the palm key points respectively, and correspondingly obtaining a first depth coordinate of each of the finger key points and a second depth coordinate of each of the palm key points respectively; and performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result.

In order to better understand a target object tracking method provided by embodiments of the present disclosure, first, describe a gesture analysis system provided by some embodiments of the present disclosure.

As shown in FIG. 1, FIG. 1 is an alternative architecture diagram of a gesture analysis system 10 provided by some embodiments of the present disclosure. In order to realize performing gesture analysis on a hand in an image, the gesture analysis system 10 provided by some embodiments of the present disclosure includes a terminal 100, a network 200 and a server 300. The terminal 100 runs a video playback application, or has a video recording unit or runs an image display application, plays a video recorded in real time or a video recorded in advance by the video recording unit through the video playback application, and takes each video frame in the video as the image, and performs the gesture analysis on the hand in the image, or performs gesture analysis on the image displayed by the image display application through the method of the embodiments of the present disclosure.

In the method of the embodiments of the present disclosure, the terminal 100 sends the image to the server 300 through the network 200 after acquiring the image; the server 300 extracts features of the image and obtains a first amount of features of first key points and a second amount of features of second key points; then the server 300 performs a UV-coordinate regression on each of the features of the first key points and each of the features of the second key points respectively and correspondingly obtains a first UV coordinate of each of the finger key points and a second UV coordinate of each of the palm key points; the server 300 performs a depth regression process on each of the features of the first key points and each of the features of the second key points respectively and obtains a first depth coordinate of each of the finger key points and a second depth coordinate of each of the palm key points respectively; and finally, the server 300 performs a gesture analysis on the image according to the first UV coordinate of each of the finger key points, first depth coordinate of each of the finger key points, the second UV coordinate of each of the palm key points and second depth coordinate of each of the palm key points, and obtains a gesture analysis result. After obtaining the gesture analysis result, the server 300 sends the gesture analysis result to the terminal 100. The terminal 100 displays a marked image marked with the gesture analysis result on a current interface 100-1 or directly displays the gesture analysis result. The method of the embodiments of the present disclosure can greatly improve accuracy of gesture analysis.

An exemplary application of the gesture analysis apparatus of some embodiments of the present disclosure is described below. In one implementation mode, the gesture analysis apparatus provided by the embodiments of the present disclosure can be implemented as a notebook computer, a tablet computer, a desktop computer, or a mobile apparatus (for example, a mobile phone, a portable music player, a personal digital assistant, a special message device, or a portable game device). In another implementation mode, the gesture analysis apparatus provided by some embodiments of the present disclosure can also be implemented as a server. Next, an exemplary application when the gesture analysis apparatus is implemented as the server will be described.

Figure 2:
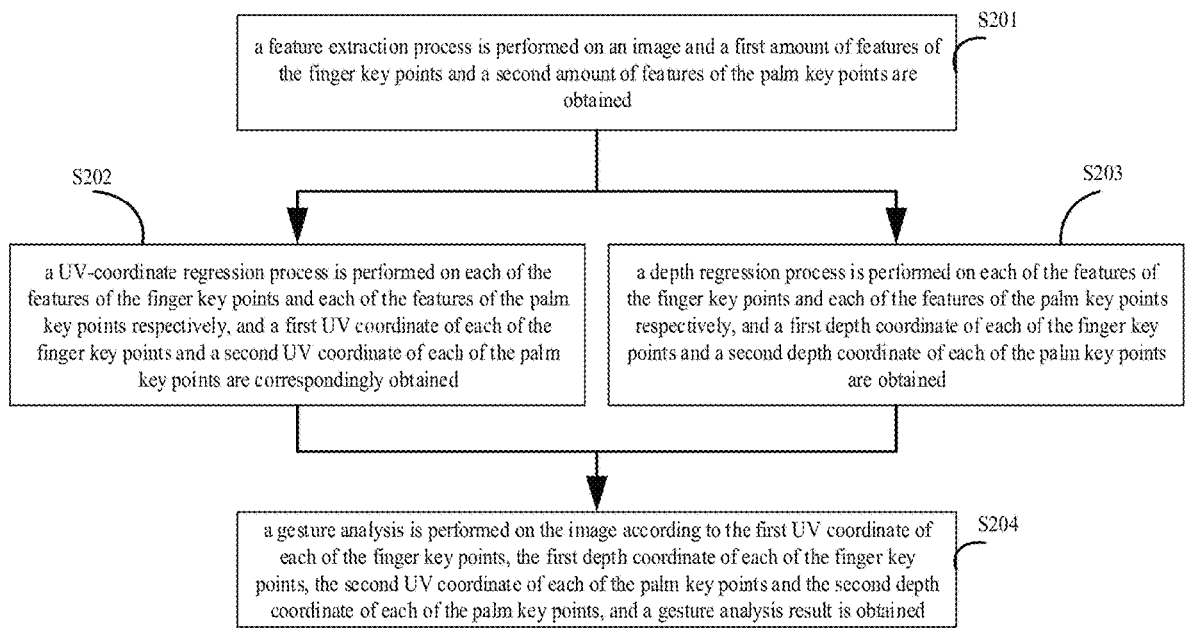
FIG. 2 is an alternative flowchart of a gesture analysis method provided by some embodiments of the present disclosure.

FIG. 2 is an alternative flowchart of a gesture analysis method provided by some embodiments of the present disclosure. As shown in FIG. 2, the method includes the following steps.

At block S201, a feature extraction process is performed on an image and a first amount of features of the finger key points and a second amount of features of the palm key points are obtained.

Here, the image has a hand image, and the feature extraction process performed on the image can be a hand feature extraction process. Before the hand feature extraction is performed on the image, a hand position recognition is performed first to determine a region where a hand is located, and the image of the region is analyzed and recognized to determine a hand gesture of the region.

In some embodiments, the hand position recognition can be realized by a pre-trained hand detection model. A probability value of the hand at each position (which can be any sub-region in a whole region of the image, also known as bounding volume or bounding box) is detected and output by the hand detection model, and the sub-region with a maximum probability value is determined as the region where the hand is located.

In the embodiments of the present disclosure, the hand feature extraction process is performed on the sub-region and the first amount of features of the finger key points and the second amount of features of the palm key points are obtained after recognizing the sub-region where the hand is located. The first amount and the second amount can be any positive integer. The hand feature extraction process can be realized by a pre-trained hand feature extraction model. The depth image with the hand can be input into the hand feature extraction model during the use of the hand feature extraction model, and the depth image is recognized inside the model to determine at least one key point of the hand in the depth image, and the at least one key point includes not only a finger key point, but also a palm key point.

In some embodiments, the method of the embodiments of the present disclosure can also be realized by an artificial intelligence technology, that is, using the artificial intelligence technology to recognize the sub-region where the hand is located, and using the artificial intelligence technology to recognize the finger key point and the palm key point.

The feature of the finger key point is an image feature obtained by performing a image feature extraction process on the finger key point, and the feature of the palm key point is an image feature obtained by performing the image feature extraction process on the palm key point.

At block S202, a UV-coordinate regression process is performed on each of the features of the finger key points and each of the features of the palm key points respectively, and a first UV coordinate of each of the finger key points and a second UV coordinate of each of the palm key points are correspondingly obtained.

Here, the UV-coordinate regression process is performed to determine the UV coordinates of each of the finger key points and each of the palm key points. The UV coordinate is a coordinate relative to XYZ coordinate.

At block S203, a depth regression process is performed on each of the features of the finger key points and each of the features of the palm key points respectively, and a first depth coordinate of each of the finger key points and a second depth coordinate of each of the palm key points are obtained.

Here, the depth regression process is performed to determine depth coordinates of finger key points and palm key points. The depth coordinates are coordinates relative to XYZ coordinates. UV coordinates and depth coordinates together form the UVD coordinates of the finger key points and the palm key points.

At block S204, a gesture analysis is performed on the image according to the first UV coordinate of each of the finger key points, the first depth coordinate of each of the finger key points, the second UV coordinate of each of the palm key points and the second depth coordinate of each of the palm key points, and a gesture analysis result is obtained.

Here, the first UV coordinate and the first depth coordinate form the UVD coordinate of the finger key point, and the second UV coordinate and the second depth coordinate form the UVD coordinate of the palm key point. The embodiments of the disclosure uses the UVD coordinates to characterize positions of the finger and palm, so as to realize the hand gesture recognition and analysis.

In some embodiments, the gesture analysis result includes a UVD coordinate of each of the finger key points and a UVD coordinate of each of the palm key points, or the gesture analysis result also includes a hand gesture structure diagram of the hand determined according to the UVD coordinate of each of the finger key points and the UVD coordinate of each of the palm key points.

The gesture analysis method provided by the embodiments of the present disclosure separates gesture estimation tasks of a finger and a palm. In a separated architecture, the feature extraction process is performed on the image and the first amount of features of first key points and the second amount of features of second key points are obtained; then the UV-coordinate regression process and the depth regression process is performed on each of the features of the finger key points and each of the features of the palm key points respectively, and the gesture analysis is performed on the image according to the result of the UV-coordinate regression process and the depth regression process and the gesture analysis result is obtained. In this way, accuracy of gesture analysis can be greatly improved.

In some embodiments, the gesture analysis system at least includes a terminal and a server, and the terminal runs a video playback application, and the method of the embodiments of the present disclosure can be used to perform the gesture analysis on the hand in each video frame of a video played by the video playback application. Or the terminal has a video recording unit, the terminal can record a video in real time through the video recording unit, and the method of the embodiments of the present disclosure can be used to perform the hand gesture on the hand in each video frame in a real-time recorded video. Or the terminal has an image capturing unit and can capture an image through the image capturing unit, and the method of the embodiments of the present disclosure can be used to perform the hand gesture on the hand in the captured image. Or the terminal runs an image display application, and can the method of the embodiments of the present disclosure can be used to perform the hand gesture on a hand in an image displayed by the image display application.

Figure 3:
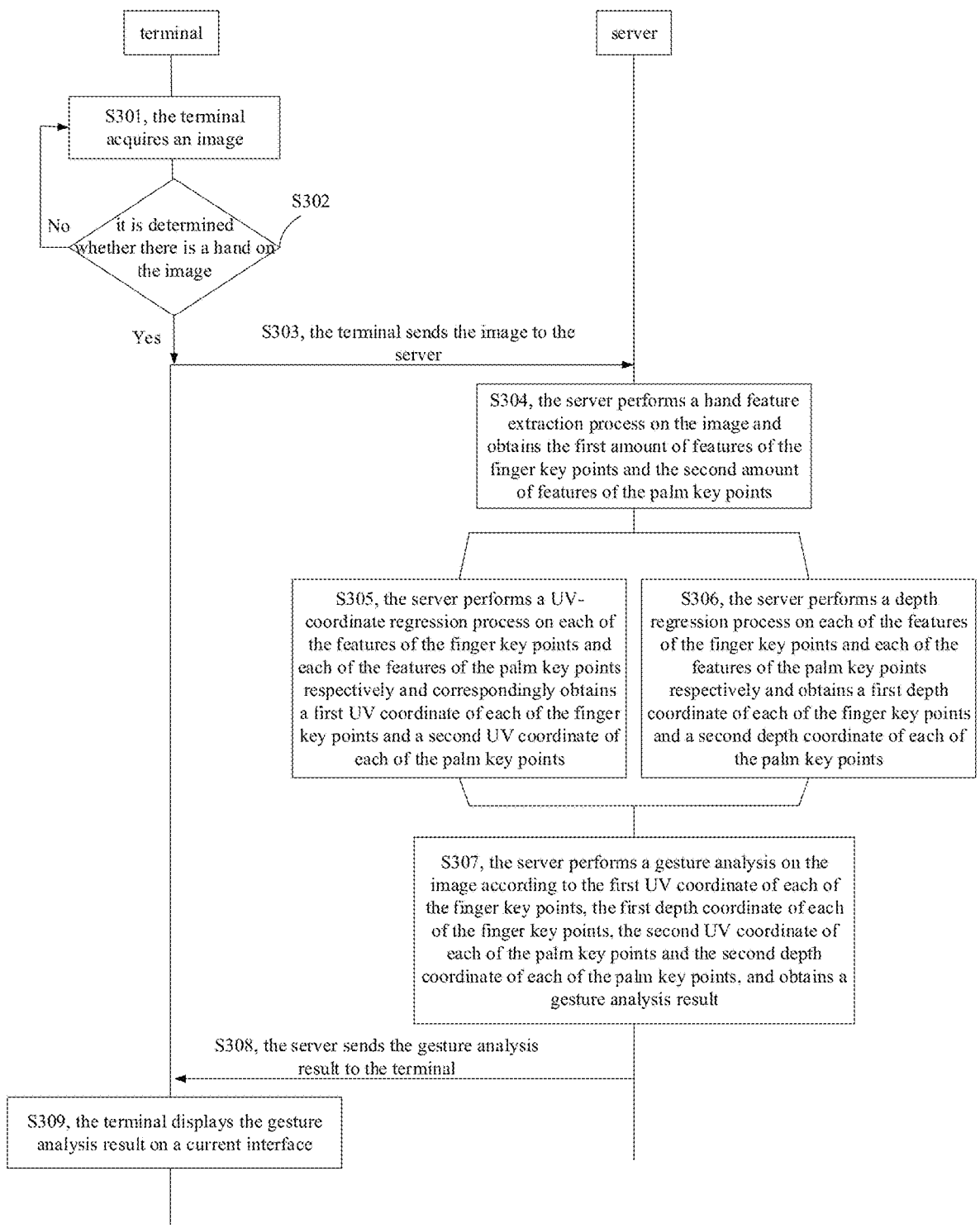
FIG. 3 is an alternative flowchart of a gesture analysis method provided by some embodiments of the present disclosure.

Next, taking the gesture analysis of the image on the terminal, feature extraction process during gesture analysis as the gesture feature extraction, and the gesture feature extraction process to obtain the first amount of features of the finger key points and the second amount of features of the palm key points as an example, the method of the embodiments of the present disclosure is described. FIG. 3 is an alternative flowchart of the gesture analysis method provided by some embodiments of the present disclosure. As shown in FIG. 3. the method includes the following steps.

At block S301, the terminal acquires an image.

Here, the terminal can download the image on a network, can also use the image capturing unit to capture the image in real time, or can also take a received image as the image.

At block S302, it is determined whether there is a hand on the image.

Here, a pre-trained hand recognition model can be used to recognize the image. When a recognition result shows that a probability value that each of the sub-regions has the hand on the image is greater than a threshold, it indicates that there is the hand in the sub-region, and it is determined that there is the hand on the image. When the recognition result shows that the probability value of existing the hand in each sub-region on the image is less than the threshold, it indicates that there is no hand on the image.

If a determining result is yes, operations at block S303 are performed. If the determining result is no, operations at block S301 are continued to be performed.

At block S303, the terminal sends the image to the server.

At block S304, the server performs a hand feature extraction process on the image and obtains the first amount of features of the finger key points and the second amount of features of the palm key points.

At block S305, the server performs a UV-coordinate regression process on each of the features of the finger key points and each of the features of the palm key points respectively and correspondingly obtains a first UV coordinate of each of the finger key points and a second UV coordinate of each of the palm key points.

At block S306, the server performs a depth regression process on each of the features of the finger key points and each of the features of the palm key points respectively and obtains a first depth coordinate of each of the finger key points and a second depth coordinate of each of the palm key points.

At block S307, the server performs a gesture analysis on the image according to the first UV coordinate of each of the finger key points, the first depth coordinate of each of the finger key points, the second UV coordinate of each of the palm key points and the second depth coordinate of each of the palm key points, and obtains a gesture analysis result.

It should be noted that operations at blocks S304 to S307 are the same as operations at blocks S201 to S204 above, and the embodiments of the present disclosure will not be repeated.

At block S308, the server sends the gesture analysis result to the terminal.

At block S309, the terminal displays the gesture analysis result on a current interface.

In the gesture analysis method provided by some embodiments of the present disclosure, the terminal obtains the image and sends the image to the server for analysis and recognition. When the hand gesture of the hand in the image is analyzed, the gesture analysis result is fed back to the terminal and displayed on the current interface of the terminal. In this way, real-time gesture analysis on the image acquired by the terminal in real time can be realized through interaction between the terminal and the server, and user experience is improved. Moreover, since the server separates gesture estimation tasks of finger and palm when performing gesture analysis, in a separated architecture, the finger and palm key points are processed respectively to realize the gesture analysis of the whole hand. In this way, the accuracy of gesture analysis can be greatly improved.

Figure 4:
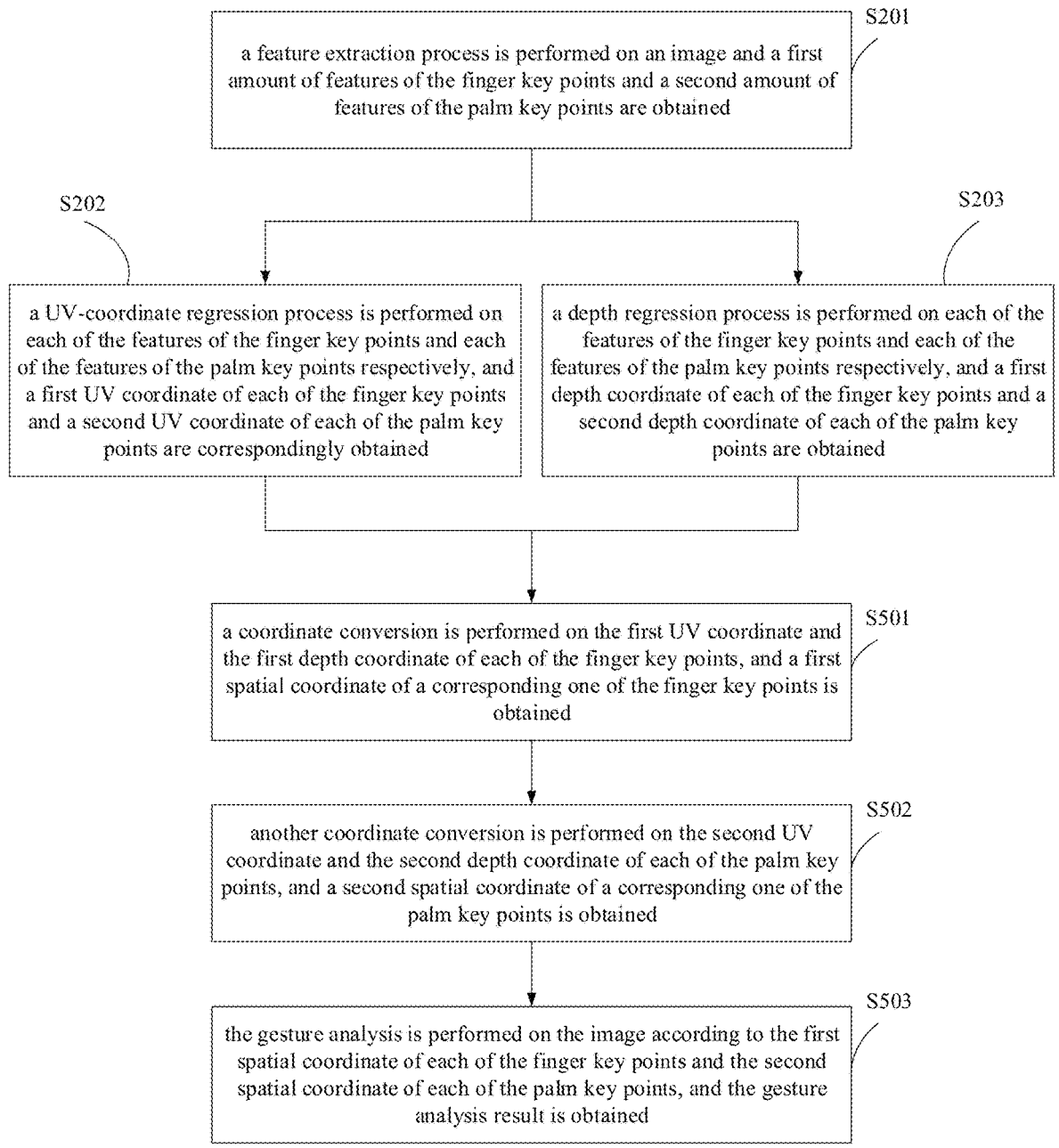
FIG. 4 is an alternative flowchart of a gesture analysis method provided by some embodiments of the present disclosure.

Based on FIG. 2, FIG. 4 is an alternative flowchart of the gesture analysis method provided by some embodiments of the present disclosure. As shown in FIG. 4, operations at block S202 can be implemented by the following operations.

At block S401, a UV coding process is performed on each of the features of the finger key points and each of the features of the palm key points respectively and a first UV coding feature of each of the finger key points and a second UV coding feature of each of the palm key points are obtained.

It should be noted that the UV coding process of the embodiments of the present disclosure is performed for the features of the finger key points and the features of the palm key points respectively, and the UV coding process for the feature of the finger key point is the same as that for the feature of the palm key point.

In some embodiments, operations that the UV coding process is performed on each of the features of the finger key points and the first UV coding feature of each of the finger key points is obtained at block S401 can be implemented by the following operations.

At block S4011, a convoluting process is performed on each of the features of the finger key points is convoluted by a first convolution layer and a first convolution feature of each of the finger key points is obtained.

Here, the first convolution layer has specific convolution kernels, and the number of the convolution kernels of the first convolution layer can be preset or obtained through training.

At block S4012, skip connection processes are performed on the first convolution feature of each of the finger key points for a first preset amount of times by the first convolution layer, and a first skip connection feature of each of the finger key points is obtained.

Here, the skip connection processes can solve a problem of gradient disappearance in the case of deep network layers, help back propagation of gradient and speed up a process of image processing.

In some embodiments, operations at block 4012 may be implemented by the following operations.

At block S4012a, the first convolution feature is determined as an input feature of the first convolution layer in a first skip connection process.

Here, the first convolution feature obtained by performing convoluting process on each of the features of the finger key points by the first convolution layer is determined as the input feature in a first skip connection process, that is, the skip connection process are performed after the convoluting process by the first convolution layer, and the first convolution layer performs the convoluting process, then the skip connection processes are performed.

At block S4012b, an output feature of the first convolution layer at a N-th time is determined as an input feature of the first convolution layer at a (N+)-th skip connection process, and N is an integer greater than 1.

In the skip connection process, an output skip of the first convolution layer is connected to an input position of the first convolution layer. Then, in the (N+1)-th skip connection process, the input feature is the output feature of the first convolution layer in the N-th time.

At block S4012c, the input feature determined at each time is input into the first convolution layer, and the skip connection processes are successively performed for a first preset amount of times and the first skip connection feature is obtained.

The whole skip connection processes are as follows: after the first convolution feature is obtained by the first convolution layer performing the convoluting process on the feature of each of the finger key point, the first convolution feature is input into the first convolution layer for the first skip connection process and the output feature of the first skip connection process is obtained. Then, the output feature of the first skip connection process is input into the first convolution layer as an input feature of second skip connection process, and the second skip connection process is performed and an output feature of the second skip connection process is obtained. Then, the output feature of the second skip connection process is input into the first convolution layer as an input feature of third skip connection process. and so on until the skip connection process is completed for a first preset amount of times and the first skip connection feature is obtained.

At block S4013, a pooling process is performed on the first skip connection feature of each of the finger key points, a spatial size of the first skip connection feature thereof is reduced, and the first UV coding feature of each of the finger key points is obtained.

Here, the first skip connection feature can be pooled by a preset first pooling layer. The pooling process is known as a down sampling process, the pooling process is used to reduce the spatial size of the first skip connection feature thereof.

In some embodiments, operations that the UV coding process is performed on each of the features of the palm key points and the second UV coding feature of each of the palm key points is obtained at block S401 can be implemented by the following operations.

At block S4014, a convoluting process is performed on each of the features of the palm key points is convoluted by a second convolution layer, and a second convolution feature of each of the palm key points is obtained.

Here, the second convolution layer has specific convolution kernels, and the number of the convolution kernels of the second convolution layer can be preset or obtained through training.

At block S4015, skip connection processes are successively performed on the second convolution feature of each of the palm key points for a second preset amount of times by the second convolution layer and a second skip connection feature of each of the palm key points is obtained.

In some embodiments, operations at block S4015 may be implemented by the following operations.

At block S4015a, the second convolution feature is determined as an input feature of the second convolution layer in a first skip connection process.

At block S4015b, an output feature of the second convolution layer at a K-th time is determined as an input feature of the second convolution layer at (K+1)-th skip connection process, and K is an integer greater than 1.

At block S4015c, the input feature determined at each time is input into the second convolution layer, and the skip connection processes are successively performed for the second preset amount of times, and the second skip connection feature is obtained.

It should be noted that the processes of performing the skip connection for the second preset amount of times at blocks S4015a to S4015c is the same as the processes of performing the skip connection for the first preset amount of times. Please referring to the explanation of operations at blocks S4012a to S4012c above, and the embodiments of the present disclosure will not be repeated. The first preset amount of times and the second preset amount of times can be the same or different. The first preset amount of times and the second preset amount of times can be determined according to the data processing demand and data processing capacity.

At block S4016, a pooling process is performed on the second skip connection feature of each of the palm key points, a spatial size of the second skip connection feature thereof is reduced and the second UV coding feature of each of the palm key points is obtained.

Here, the pooling process can be performed on the second skip connection feature of each of the palm key points by a preset second pooling layer.

At block S402: a full connection process is performed on the first UV coding feature of each of the finger key points and the second UV coding feature of each of the palm key points are respectively, and the first UV coordinate of each of the finger key points and the second UV coordinate of each of the palm key points are correspondingly obtained.

As shown in FIG. 4, operations at block Step S203 can be implemented by the following operations.

At block S403, a depth coding process is performed on each of the features of the finger key points and each of the features of the palm key points respectively and a first depth coding feature of each of the finger key points and a second depth coding feature of each of the palm key points are obtained.

It should be noted that the depth coding process of the embodiments of the present disclosure is performed on each of the features of the finger key points and each of the features of the palm key points respectively, and the depth coding process on each of the features of the finger key points is the same as that for each of the features of the palm key points.

In some embodiments, operations that the depth coding process is performed on each of the features of the finger key points and the first depth coding feature of each of the finger key points is obtained at block S403 can be implemented by the following operations.

At block S4031, a convoluting process is performed on each of the features of the finger key points is convoluted by a third convolution layer, and a third convolution feature of each of the finger key points is obtained.

Here, the third convolution layer has specific convolution kernels, and the number of convolution kernels of the third convolution layer can be preset or obtained through training.

At block S4032, skip connection processes are successively performed on the third convolution feature of each of the finger key points for a third preset amount of times by the third convolution layer, and a third skip connection feature of each of the finger key points is obtained.

In some embodiments, operations at block S4032 may be implemented by the following operations.

At block S4032a, the third convolution feature is determined as an input feature of the third convolution layer in a first skip connection process.

At block S4032b, an output feature of the third convolution layer at a M-th time is determined as an input feature of the third convolution layer at (M+)-th skip connection process, and M is an integer greater than 1.

At block S4032c, the input feature determined at each time is input into the third convolution layer, the skip connection processes are successively performed for the third preset amount of times, and the third skip connection feature is obtained.

It should be noted that the processes of performing the skip connection for the third preset amount of times at block S4032a to S4032c is the same as the processes of performing the skip connection for the first preset amount of times and the processes of performing the skip connection for the second preset amount of times. Please referring to the explanation of operations at block S4012a to S4012c above, and the embodiments of the present disclosure will not be repeated.

At block S4033: a pooling process is performed on the third skip connection feature of each of the finger key points, a spatial size of the third skip connection feature thereof is reduced, and the first depth coding feature of each of the finger key points is obtained.

Here, the pooling process on the third skip connection feature of each of the finger key points can be performed by a preset third pooling layer.

In some embodiments, operations that the depth coding process is performed on each of the features of the palm key points and the second depth coding feature of each of the palm key points is obtained at block S403 can be implemented by the following operations.

At block S4034, a convoluting process on each of the features of the palm key points is convoluted by a fourth convolution layer, and a fourth convolution feature of each of the palm key points is obtained. The fourth convolution layer has specific convolution kernels.

At block S4035, skip connection processes are performed on the fourth convolution feature of each of the palm key points for a fourth preset amount of times by the fourth convolution layer, and a fourth skip connection feature of each of the finger key points is obtained.

In some embodiments, operations at block S4035 may be implemented by the following operations.

At block S4035a, the fourth convolution feature is determined as an input feature of the fourth convolution layer in a first skip connection process.

At block S4035b, an output feature of the fourth convolution layer at a L-th time is determined as an input feature of the fourth convolution layer at a (L+1)-th skip connection process, and L is an integer greater than 1.

At block S4035c, the input feature determined at each time is input into the fourth convolution layer, and the skip connection processes are successively performed for the fourth preset amount of times, and the fourth skip connection feature is obtained.

It should be noted that the processes of performing the skip connection for the fourth preset amount of times at block S4035a to S4035c is the same as the processes of performing the skip connection for the first preset amount of times, the processes of performing the skip connection for the second preset amount of times and the processes of performing the skip connection process for the third preset amount of times. Please referring to the explanation of operations at blocks S4012a to S4012c above, and the embodiments of the present disclosure will not be repeated. The third preset amount of times and the fourth preset amount of times can be the same or different. The third preset amount of times and the fourth preset amount of times can be determined according to the data processing demand and data processing capacity.

At block S4036, a pooling process is performed on the fourth skip connection feature of each of the palm key points, a spatial size of the fourth skip connection feature thereof is reduced, and the second depth coding feature of each of the palm key points is obtained.

Here, the pooling process is performed on the fourth skip connection feature of each of the palm key points by a preset fourth pooling layer.

At block S404: a full connection process is performed on the first depth coding feature of each of the finger key points and the second depth coding feature of each of the palm key points respectively, and the first depth coordinate of each of the finger key points and the second depth coordinate of each of the palm key points are obtained.

Figure 5:
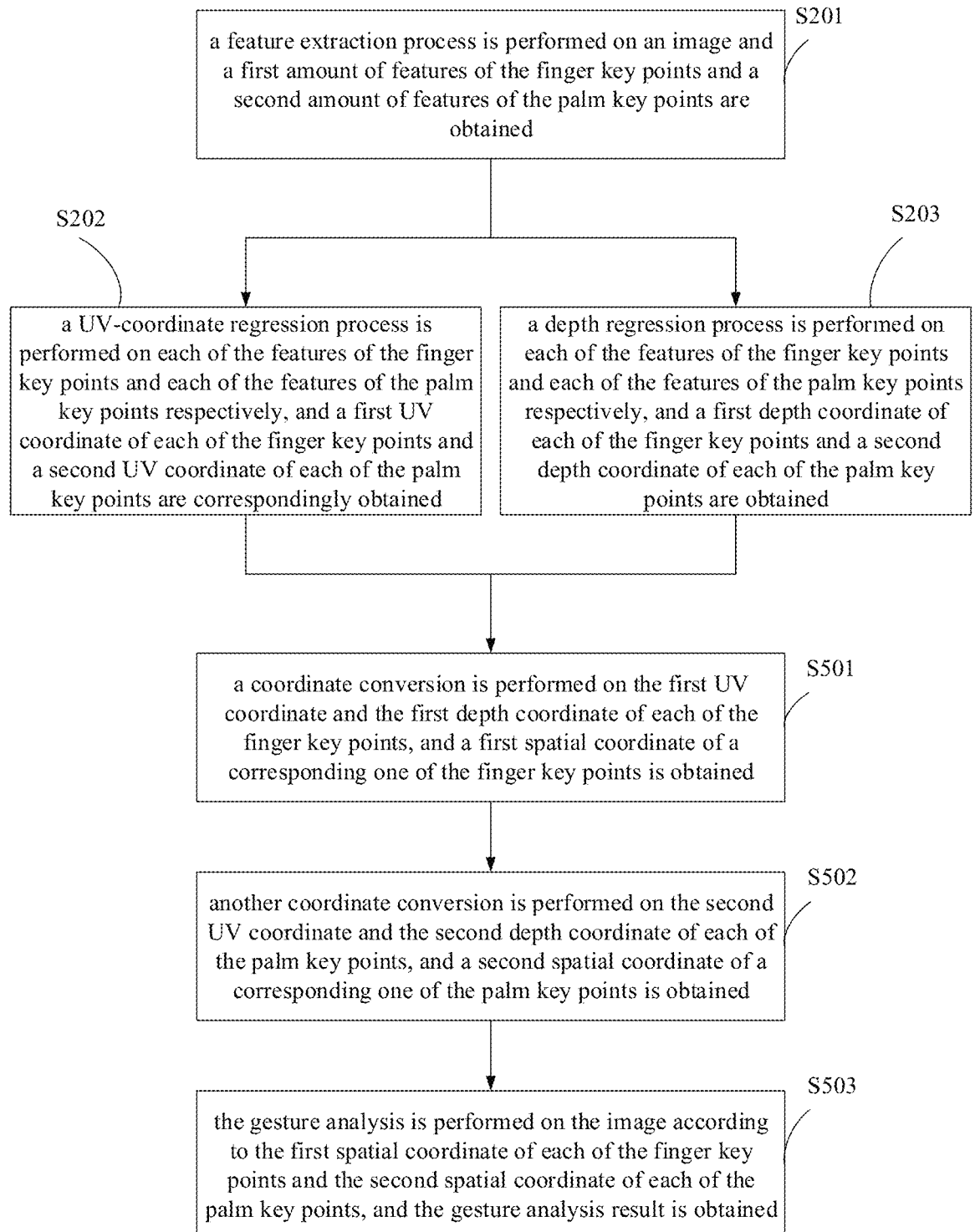
FIG. 5 is an alternative flowchart of a gesture analysis method provided by some embodiments of the present disclosure.

Based on FIG. 2, FIG. 5 is an alternative flowchart of the gesture analysis method provided by some embodiments of the present disclosure. As shown in FIG. 5, operations at block S204 can be implemented by the following operations.

At block S501, a coordinate conversion is performed on the first UV coordinate and the first depth coordinate of each of the finger key points, and a first spatial coordinate of a corresponding one of the finger key points is obtained.

Here, the coordinate conversion refers to converting the UVD coordinate into the XYZ coordinate. The UVD coordinate of each of the finger key points is determined by the first UV coordinate and the first depth coordinate, that is, the first UV coordinate and the first depth coordinate together form the UVD coordinate of each of the finger key points. The first spatial coordinate is representation of the finger key point in XYZ coordinate.

In the embodiments of the present disclosure, the conversion of UVD coordinate to XYZ coordinate can be implemented by the following formula (1-1):

$$x = \frac{(u - C_x) * d}{f_x}, y = \frac{(v - C_y) * d}{f_y}, z = d; \quad (1-1)$$

(x, y, z) is a coordinate of XYZ format, (u, v, d) is a coordinate of UVD format, u and v correspond to a pixel value of two-dimensional image, and d represents a depth value, that is, a depth value of the coordinate point from a camera. Cx and Cy represent a main point. The main point should ideally be located in a center of the image. The main point is an optical center of the camera and is generally located in the center of the image in a image coordinate system. fx and fy are respectively focal lengths in x and y directions.

At block S502, another coordinate conversion is performed on the second UV coordinate and the second depth coordinate of each of the palm key points, and a second spatial coordinate of a corresponding one of the palm key points is obtained.

Here, the UVD coordinate of the palm key point is determined by the second UV coordinate and the second depth coordinate, that is, the second UV coordinate and the second depth coordinate together form the UVD coordinate of each of the palm key points. In the embodiments of the present disclosure, coordinate conversion of the second UV coordinate and the second depth coordinate of each of the palm key points can be implemented through the above formula (1-1). The second spatial coordinate is representation of the palm key point in the XYZ coordinate.

At block S503, the gesture analysis is performed on the image according to the first spatial coordinate of each of the finger key points and the second spatial coordinate of each of the palm key points, and the gesture analysis result is obtained.

Here, XYZ coordinate representation is used for the gesture analysis, and the position of each key point of the hand in three-dimensional coordinate can be obtained, so as to obtain an accurate gesture analysis result.

In some embodiments, operations at block S503 may be implemented by the following operations.

At block S5031, a first relative positional relationship between every two of the finger key points and a second relative positional relationship between every two of the palm key points are determined.

Here, the first relative positional relationship is the relative positional relationship between every two finger key points. For example, the first relative positional relationship between two adjacent finger key points on a same finger is that the two finger key points are adjacent and can be directly connected. The first relative positional relationship between two finger key points located on two fingers is that the two finger key points cannot be connected directly.

The second relative positional relationship between the second-hand palm key points is the relative positional relationship between every two of the palm key points. For example, the palm key points of two adjacent positions on a palm can be directly connected, and the palm key points of two non-adjacent positions on the palm cannot be directly connected.

At block S5032, the first amount of finger key points and the second amount of palm key points are successively connected according to the first relative positional relationship between every two of the finger key points and the second relative positional relationship between every two of the palm key points, and a hand key-point connection diagram is formed.

Here, the hand key-point connection diagram includes the XYZ coordinate of each key point.

At block 5033: the gesture analysis is performed on the image according to the hand key-point connection diagram, and the gesture analysis result is obtained.

Here, a shape of each finger and a shape of the palm can be determined through the hand key-point connection diagram, so as to determine the gesture analysis result of the hand.

Figure 6:
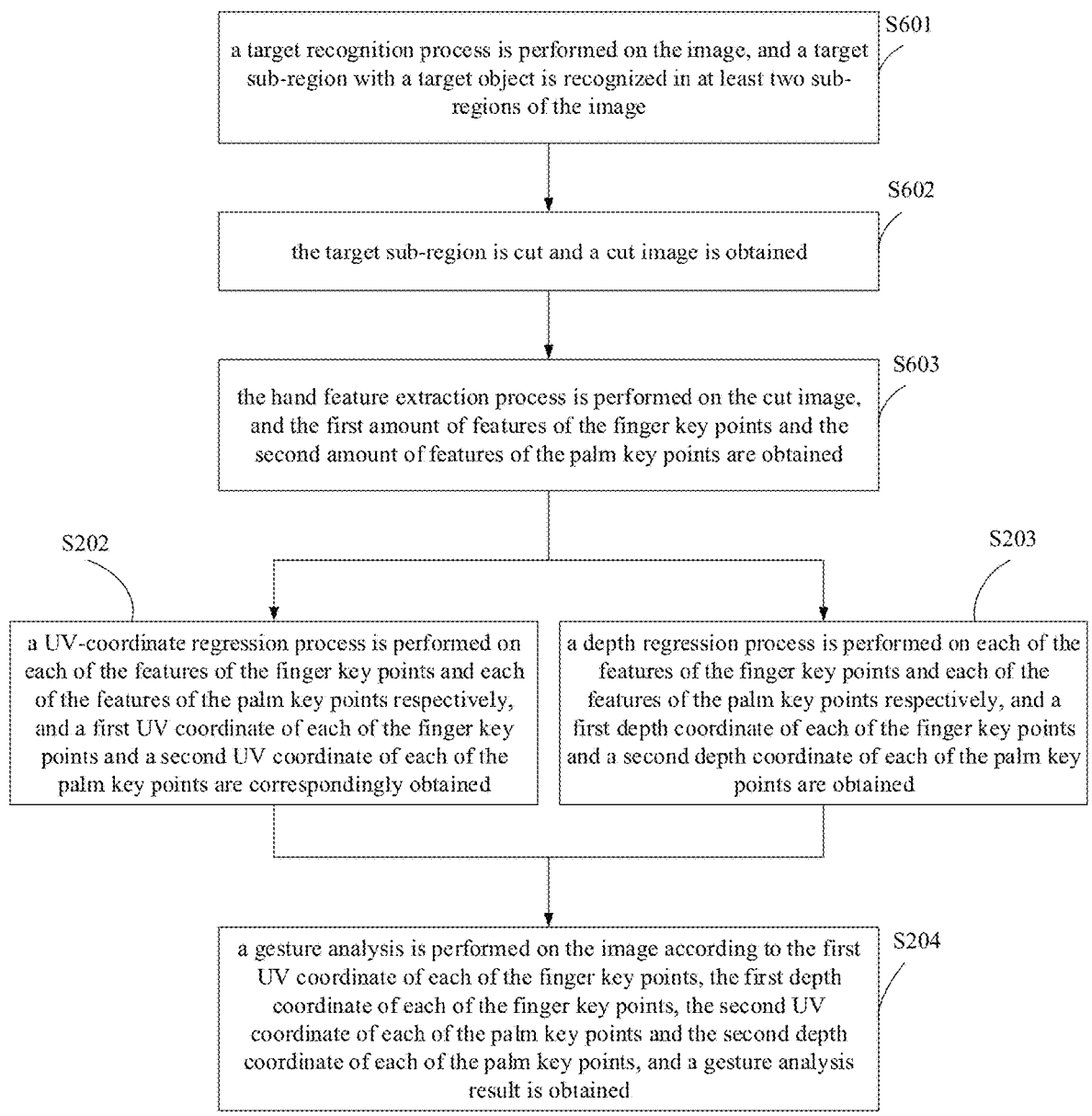
FIG. 6 is an alternative flowchart of a gesture analysis method provided by some embodiments of the present disclosure.

Based on FIG. 2, FIG. 6 is an alternative flowchart of the gesture analysis method provided by some embodiments of the present disclosure. As shown in FIG. 6, operations at block S201 can be implemented by the following operations.

At block S601, a target recognition process is performed on the image, and a target sub-region with a target object is recognized in at least two sub-regions of the image.

In some embodiments, operations at block S601 may be implemented by the following operations.

At block S6011, a scanning frame with a preset size is obtained, and a size of the image is greater than the preset size.

Here, the region corresponding to the image includes a plurality of sub-regions, and the size of the sub-region is the same as a size of the scanning frame, that is, each time the scanning frame scans to a position, the position corresponds to a sub-region.

At block S6012, the scanning frame is slid on the image to be analyzed, and a probability value that each of the sub-regions has the target object existing therein is determined.

Here, for the sub-region to which the scanning frame slides, it is determined whether there is the target object in the sub-region. In the embodiments of the present disclosure, the target object can be the hand. The sub-regions can be recognized by a pre-trained target recognition model and the probability value that each of the sub-regions has the target object existing therein is determined.

At block S6013, a sub-region with a highest probability value is determined as the target sub-region.

At block S602, the target sub-region is cut and a cut image is obtained.

Here, the target sub-region is cut to eliminate other regions that do not include the hand, so as to reduce the amount of data processing in subsequent gesture analysis process.

At block S603, the hand feature extraction process is performed on the cut image, and the first amount of features of the finger key points and the second amount of features of the palm key points are obtained.

In some embodiments, operations at block S603 may be implemented by the following operations.

At block S6031, a RoI matching feature extraction is performed on the cut image, and at least two image RoI matching features on pixel points whose coordinate are floating-point numbers are obtained.

At block S6032, a RoI matching feature diagram is determined according to the at least two image RoI matching features.

Here, the RoI matching feature diagram is determined according to extracted image RoI matching features, that is, the extracted image RoI matching features are embedded into a feature diagram to form the RoI matching feature diagram. In this way, in the subsequent gesture analysis process, the features of the finger and the palm can be extracted from the RoI matching feature diagram without starting from the original image.

At block S6033, a two-dimensional hand pose estimation is performed on the RoI matching feature diagram, and the first amount of features of the finger key points and the second amount of features of the palm key points are determined.

Figure 7:
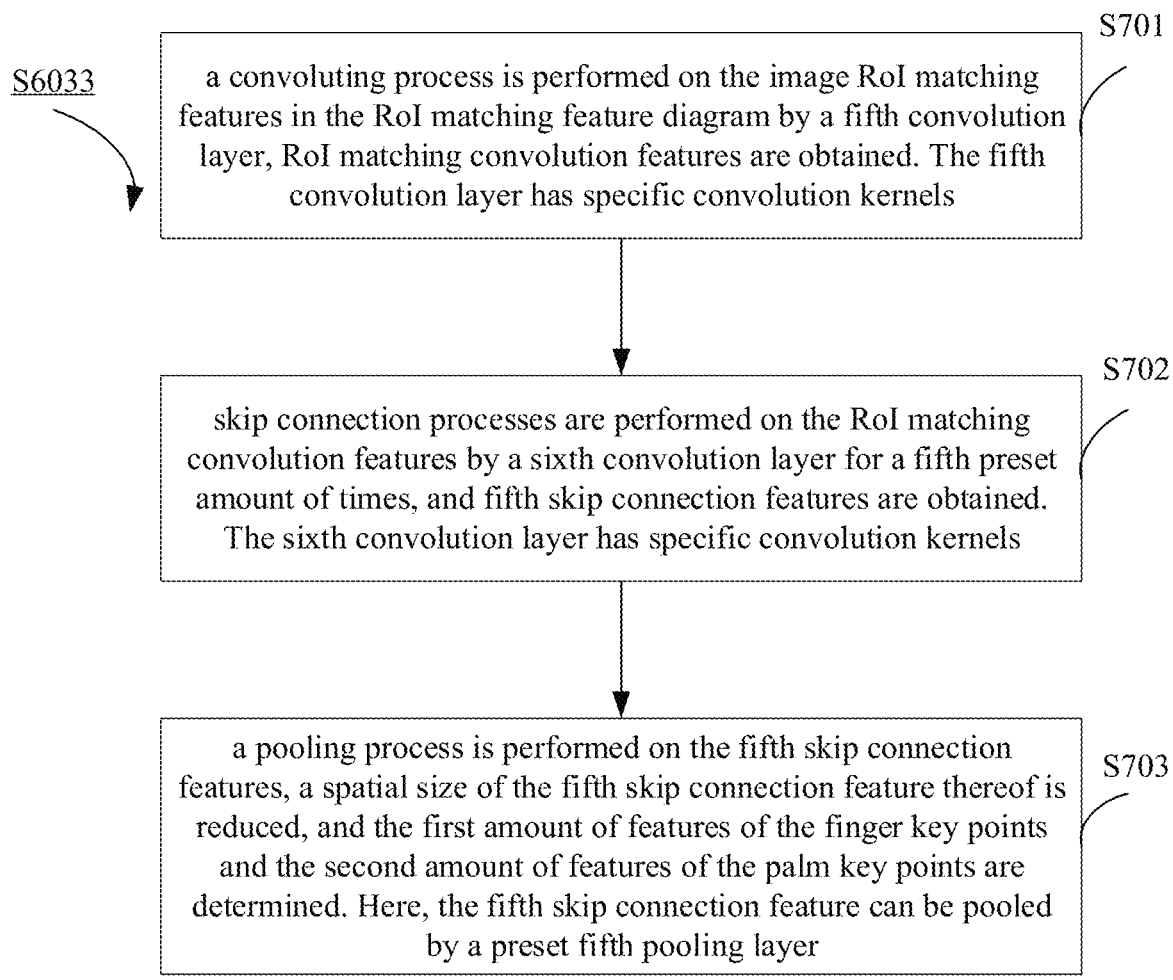
FIG. 7 is an alternative flowchart of a gesture analysis method provided by some embodiments of the present disclosure.

FIG. 7 is an alternative flowchart of the gesture analysis method provided by some embodiments of the present disclosure. As shown in FIG. 7, operations at block S6033 can be implemented by the following operations.

At block S701, a convoluting process is performed on the image RoI matching features in the RoI matching feature diagram by a fifth convolution layer, RoI matching convolution features are obtained. The fifth convolution layer has specific convolution kernels.

At block S702, skip connection processes are performed on the RoI matching convolution features by a sixth convolution layer for a fifth preset amount of times, and fifth skip connection features are obtained. The sixth convolution layer has specific convolution kernels.

At block S703, a pooling process is performed on the fifth skip connection features, a spatial size of the fifth skip connection feature thereof is reduced, and the first amount of features of the finger key points and the second amount of features of the palm key points are determined. Here, the fifth skip connection feature can be pooled by a preset fifth pooling layer.

In some embodiments, the gesture analysis method provided by some embodiments of the present disclosure can also be realized by the gesture analysis model, that is, the gesture analysis model is used to perform the hand feature extraction processing, the UV-coordinate regression process, the depth regression process and the gesture analysis and obtain the gesture analysis result.

Figure 8:
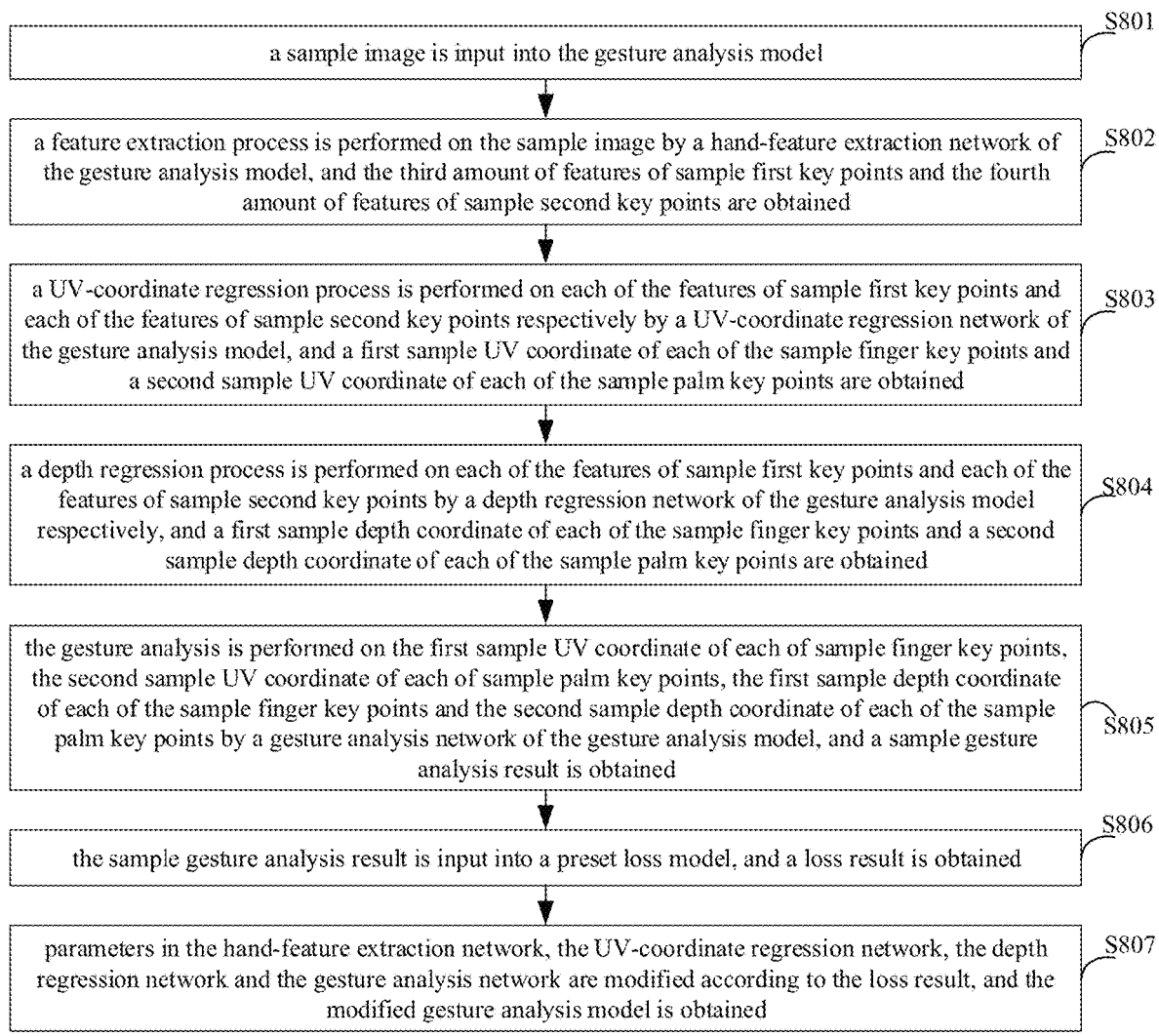
FIG. 8 is an alternative flowchart of a gesture analysis model training method provided by some embodiments of the present disclosure.

FIG. 8 is an alternative flowchart of a gesture analysis model training method provided by some embodiments of the present disclosure. As shown in FIG. 8, the training method includes the following operations.

At block S801, a sample image is input into the gesture analysis model.

At block S802, a feature extraction process is performed on the sample image by a hand-feature extraction network of the gesture analysis model, and the third amount of features of sample first key points and the fourth amount of features of sample second key points are obtained.

Here, the features of sample first key points can be features of sample finger key points, and the features of sample second key points can be features of sample palm key points. The hand-feature extraction network can include two branches, one is a finger feature extraction branch and the other is a palm feature extraction branch. The finger feature extraction branch is used to perform the extraction process on the finger feature of the sample image and the third amount of features of sample finger key points are obtained, and the palm feature extraction branch is used to perform the extraction process on the palm features of the sample image and the fourth amount of features of sample palm key points are obtained.

At block S803, a UV-coordinate regression process is performed on each of the features of sample first key points and each of the features of sample second key points respectively by a UV-coordinate regression network of the gesture analysis model, and a first sample UV coordinate of each of the sample finger key points and a second sample UV coordinate of each of the sample palm key points are obtained.

The UV-coordinate regression network is configured to perform the UV-coordinate regression process on each of the sample finger key points and each of the sample finger key points and the UV coordinate of each sample key point (including the sample finger key point and the sample palm key point) is determined.

At block S804, a depth regression process is performed on each of the features of sample first key points and each of the features of sample second key points by a depth regression network of the gesture analysis model respectively, and a first sample depth coordinate of each of the sample finger key points and a second sample depth coordinate of each of the sample palm key points are obtained.

The depth regression network is used to perform the depth regression process on features of sample finger key points and features of sample palm key points, and the depth coordinate of each key point of the sample is determined.

At block S805, the gesture analysis is performed on the first sample UV coordinate of each of sample finger key points, the second sample UV coordinate of each of sample palm key points, the first sample depth coordinate of each of the sample finger key points and the second sample depth coordinate of each of the sample palm key points by a gesture analysis network of the gesture analysis model, and a sample gesture analysis result is obtained.

At block S806, the sample gesture analysis result is input into a preset loss model, and a loss result is obtained.

Here, the preset loss model is used to compare the sample gesture analysis result with a preset gesture analysis result to obtain the loss result. The preset gesture analysis result can be a gesture analysis result corresponding to the sample image preset by a user.

In the embodiments of the present disclosure, the preset loss model includes a loss function, similarity between the sample gesture analysis result and the preset gesture analysis result can be calculated through the loss function. In calculation process, a distance between the sample gesture analysis result and the preset gesture analysis result can be calculated, and the above loss result can be determined according to the distance. When the distance between the sample gesture analysis result and the preset gesture analysis result is larger, it indicates that a training result of the model has a large gap with a real value, and further training is needed. When the distance between the sample gesture analysis result and the preset gesture analysis result is smaller, it indicates that the training result of the model is closer to the real value.

At block S807, parameters in the hand-feature extraction network, the UV-coordinate regression network, the depth regression network and the gesture analysis network are modified according to the loss result, and the modified gesture analysis model is obtained.

Here, when the above distance is greater than a preset distance threshold, the loss result shows that the hand-feature extraction network in the current gesture analysis model cannot accurately perform the extraction process on the hand features of the sample image to obtain accurate features of sample finger key points and features of sample palm key points of the sample image, and/or, the UV-coordinate regression network cannot accurately perform the UV-coordinate regression process on features of sample finger key points and features of sample palm key points to obtain accurate first sample UV coordinates of finger key points and the second sample UV coordinates of palm key points, and/or, the depth regression network can not accurately perform the depth regression processing on features of sample finger key points and features of sample palm key points to obtain accurate first sample depth coordinates of finger key points of the sample and second sample depth coordinates of palm key points of the sample, and/or the gesture analysis network can not accurately performed the gesture analysis on the first sample UV coordinates, the second sample UV coordinates, the first sample depth coordinates and the second sample depth coordinates to obtain an accurate sample gesture analysis result corresponding to the sample image. Therefore, the current gesture analysis model needs to be modified. Then, according to the above distance, parameters in at least one of the hand-feature extraction network, UV-coordinate regression network, the depth regression network and the gesture analysis network can be modified until the distance between the sample gesture analysis result output by the gesture analysis model and the preset gesture analysis result meets a preset condition, and then the corresponding gesture analysis model is determined as a trained gesture analysis model.

In the training method of the gesture analysis model provided by some embodiments of the present disclosure, the sample image is input into the gesture analysis model, the sample image is processed by hand-feature extraction network, UV-coordinate regression network, depth regression network and gesture analysis network, the sample gesture analysis result is obtained, and the sample gesture analysis result is input into the preset loss model, and the loss result is obtained. Therefore, the parameters in at least one of the hand-feature extraction network, UV-coordinate regression network, depth regression network and gesture analysis network can be modified according to the loss result, and the obtained gesture analysis model can accurately determine the hand gesture of the image and improve the user experience.

Next, an exemplary application of the embodiment of the present disclosure in an actual application scenario will be described.

Some embodiments of the present disclosure provides a gesture analysis method. Gesture estimation of the finger is more difficult than that of the palm, because the finger is highly deformed during movement, and the palm usually maintains a rigid surface. Through such discovery, the embodiment of the present disclosure separates the pose estimation tasks of the finger and the palm. In this separated architecture, finger features or palm features are extracted specifically for the finger or the palm, so as to obtain better gesture estimation performance.

Before explaining the method of the embodiments of the present disclosure, first describe the technology involved in the embodiments of the present disclosure.

Figure 9:
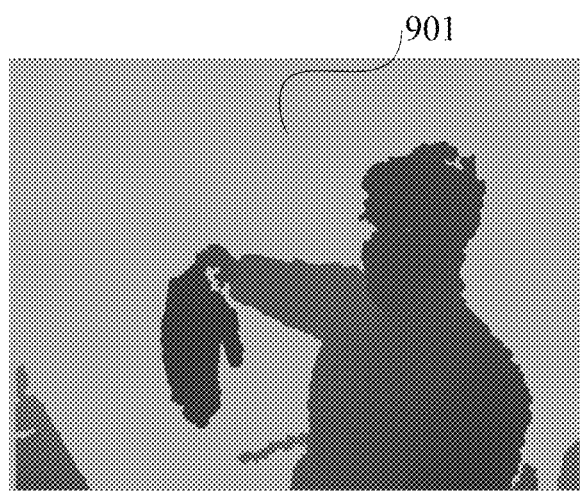
FIG. 9 is an example image captured by a TOF camera provided by some embodiments of the present disclosure.

1) Time of flight (TOF) camera: TOF camera is a three-dimensional imaging camera system. The TOF camera uses time-of-flight technology to analyze a distance between each point of a shooting subject on an image and a camera by measuring a round-trip time of artificial light signal sent by a laser or LED. The TOF camera outputs an image with a frame size of H×W, and each pixel value on a two-dimensional image represents a depth value of an object (i.e. a pixel value range is 0 mm~3000 mm). FIG. 9 is an example image 901 captured by the TOF camera provided by some embodiments of the present disclosure. Next, the image 901 captured by the TOF camera is used as a depth image (i.e., an image).

Figure 10:
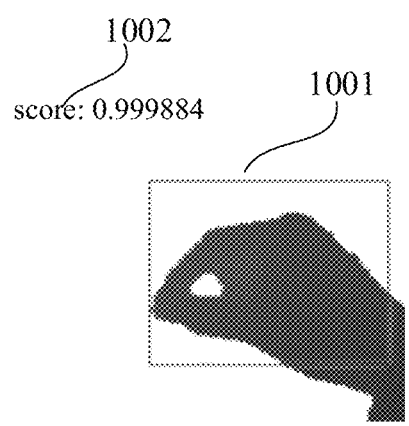
FIG. 10 is a hand detection result including a prediction range and a hand presence probability provided by some embodiments of the present disclosure.

2) Hand detection: the hand detection is a process of inputting the depth image and then outputting a probability of hand existence (for example, the probability can be a number with a value from 0 to 1. The greater the value, the greater the probability of hand existence, that is, the greater the confidence), and a prediction range of a hand (i.e. bounding box) (for example, the prediction range represents a position and a size of the hand). FIG. 10 is a hand detection result including a prediction range 1001 and a hand presence probability 1002 (i.e., confidence) provided by some embodiments of the present disclosure. In the embodiments of the present disclosure, the prediction range of the hand is expressed as $(x_{min}, y_{min}, x_{max}, y_{max})$, wherein $(x_{min}, y_{min})$ is an upper left corner of the prediction range and $(x_{max}, y_{max})$ is a lower right corner of the prediction range.

Figure 11:
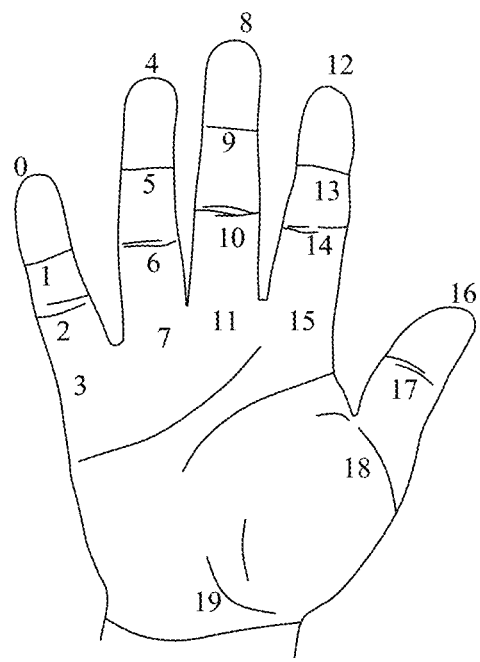
FIG. 11 is an example diagram of positions of key points of a hand provided by some embodiments of the present disclosure.
Figure 12:
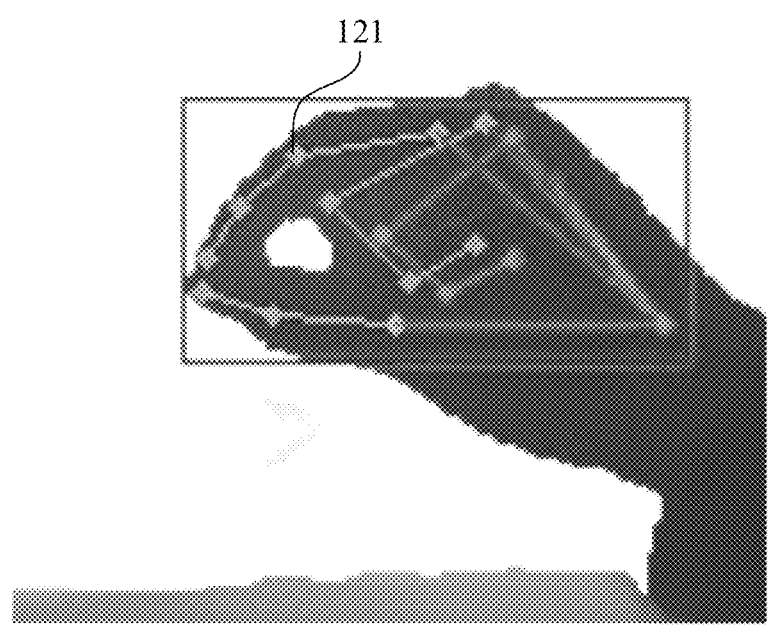
FIG. 12 is an example diagram of two-dimensional hand posture estimation results provided by some embodiments of the present disclosure.

3) Two-dimensional gesture estimation: the two-dimensional gesture estimation is a process of inputting the depth image, and then outputting two-dimensional key point positions of a hand skeleton. The example diagram of the key point positions of the hand is shown in FIG. 11. Positions 0, 1, 2, 4, 5, 6, 8, 9, 10, 12, 13, 14, 16 and 17 represent the key points of fingers, and positions 3, 7, 11, 15, 18 and 19 represent the key points of a palm. Each key point is a two-dimensional coordinate representing the position (for example, x, y, x is on a horizontal image axis and y is on a vertical image axis). The two-dimensional hand pose estimation result are shown in FIG. 12. FIG. 12 includes a plurality of estimated hand key points 121.

4) Three-dimensional gesture estimation: The three-dimensional gesture estimation is a process of inputting the depth image and output three-dimensional key point positions of the hand skeleton. The example image of the key point positions of the hand is shown in FIG. 11. Each key position is a three-dimensional coordinate (such as x, y, z, x is on the horizontal image axis, y is on the vertical image axis, and Z is in a depth direction). The embodiments of the present disclosure is to study problems of three-dimensional hand pose estimation.

Figure 13:
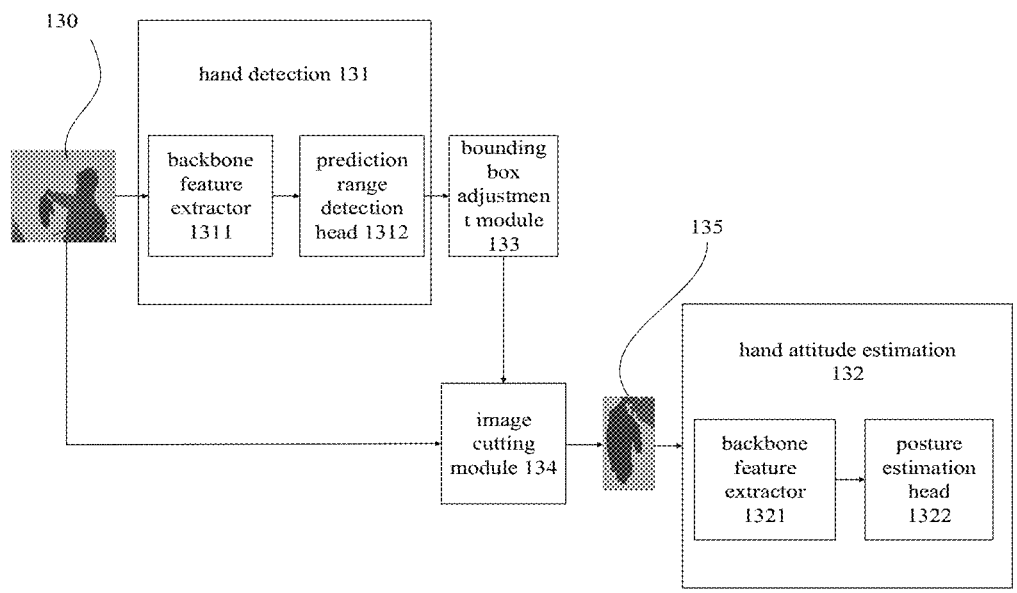
FIG. 13 is a schematic diagram of a process of hand detection and hand posture estimation provided by some embodiments of the present disclosure.

5) Gesture detection process: a typical hand posture detection process includes: the hand detection and the hand posture estimation process. As shown in FIG. 13, the hand detection 131 includes a backbone feature extractor 1311 and a prediction range detection head 1312, and the hand posture estimation 132 includes a backbone feature extractor 1321 and a posture estimation head 1322. It should be noted that tasks of the hand detection 131 and the hand posture estimation 132 are completely separated. In order to connect the two tasks, a position of the output prediction range is adjusted to a centroid of pixels within a prediction range, and a size of the prediction range is slightly enlarged to include all hand pixels, that is, the size of the prediction range is adjusted by a bounding box adjustment module 133. An adjusted prediction range is used to crop an original depth image, that is, the adjusted prediction range is cropped by an image cutting module 134. A cropped image 135 is input into the hand pose estimation task 132. It should be noted that when the backbone feature extractor is used to extract the image features of the initial image 130, repeated calculation will occur.

Figure 14:
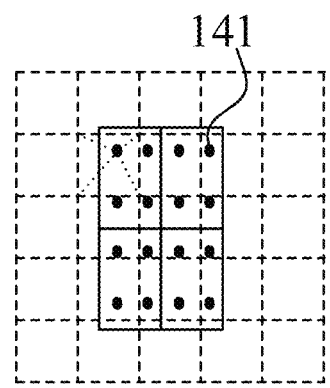
FIG. 14 is a schematic diagram of a principle RoI Align provided by some embodiments of the present disclosure.

6) Rage of Interesting Alignment (RoI align): a RoI align layer eliminates harsh quantization of RoIPool and correctly aligns the extracted features with the input. An improvement provided by the embodiments of the present disclosure is simple: any quantization of RoI boundaries or bins is avoided (for example, x/16 can be used instead of [x/16], x/16 represents floating point numbers and [x/16] represents rounding). A bilinear interpolation calculation method is used to calculate accurate values of input features of four periodic sampling positions in each RoI bin, and summarize a result (using a maximum value or an average value), as shown in FIG. 14. FIG. 14 is a schematic diagram of a principle of the RoI align provided by some embodiments of the present disclosure. Dotted grid represents a feature diagram, and solid line represents a RoI (in the embodiments, there are 2×2 boxes). Points in the figure represent 4 sampling points 141 in each box. The RoI align calculates a value of each sampling point through bilinear interpolation from adjacent grid points on the feature diagram, and does not perform quantization on the RoI, container of the RoI or any coordinates involved in sampling points. It should be noted that as long as the quantization is not performed, a result is not sensitive to an exact sampling position or the number of sampling points.

7) Non-maximum suppression (NMS): NMS has been widely used in several key aspects of computer vision. The NMS is an integral part of many proposed detection methods, and may be edge, angle or target detection. Necessity of the NMS is that detection algorithm has weak ability to locate concept of interest, resulting in a plurality of groups of detection results near the real position.

Figure 15:
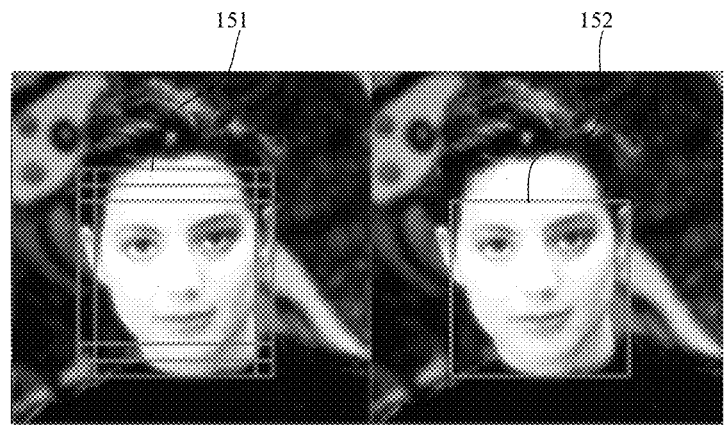
FIG. 15 is a schematic diagram of a result of NMS provided by some embodiments of the present disclosure.

In target detection, a method based on sliding window usually produces a plurality of high score windows close to correct positions of the target. This is a result of generalization ability of an object detector, smoothness of response function and visual correlation of a near window. This relatively dense output is usually not satisfactory for understanding content of the image. In fact, the number of windows assumed in this step is not related to the real number of objects in the image. Therefore, a goal of the NMS is to retain only one window per group, corresponding to an exact local maximum of the response function. Ideally, each object can be detected only once. FIG. 15 is a schematic diagram of a result of the NMS provided by some embodiments of the present disclosure. FIG. 15 shows an example of the NMS. The left part shows a result of detection without NMS technology, leading to a plurality of groups of detection results 151 (i.e. the detection box in the figure) near the real position (i.e. the face position), and the right part shows a test result using NMS technology, and only one test result 152 is retained in the real position.

Figure 16:
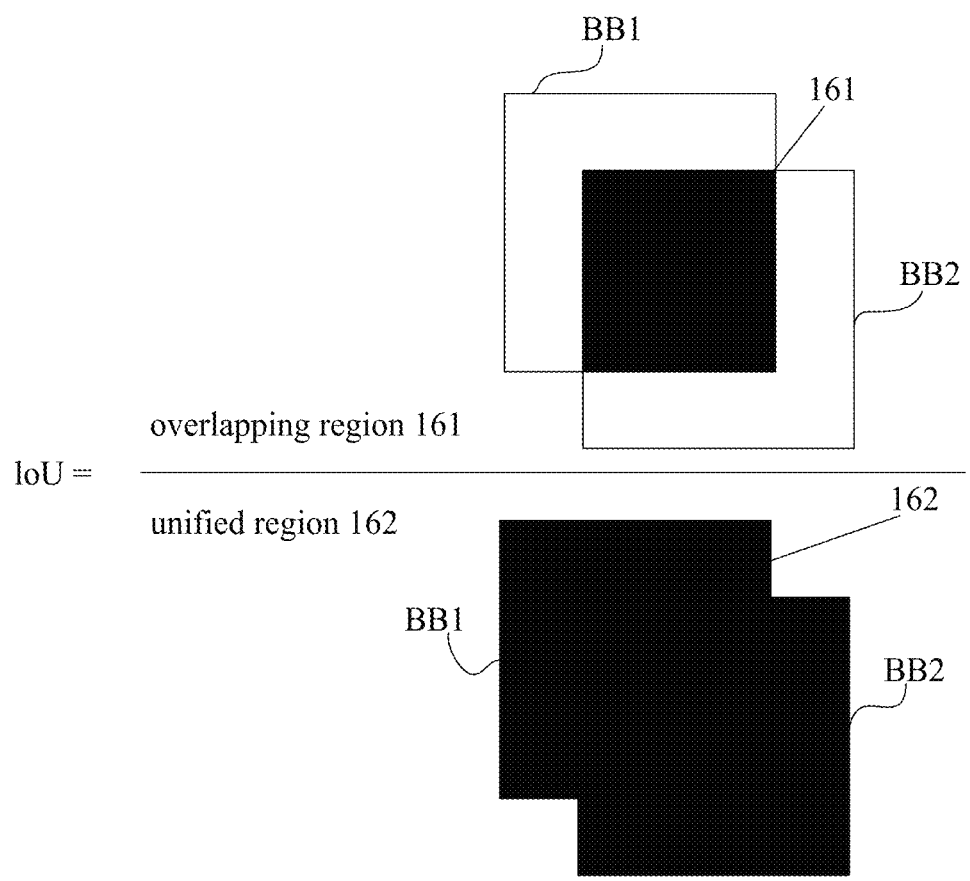
FIG. 16 is a principle diagram of an IOU provided by some embodiments of the present disclosure.

8) Prediction range operation: some embodiments of the present disclosure defines two simple prediction range operations. As shown in FIG. 16, two prediction ranges BB1 and BB2 are given, intersection of BB1 and BB2 is represented as BB1∩BB2 and defined as an overlapping region 161 of BB1 and BB2; and BB1☐BB2 is defined as an unified region 162 of BB1 and BB2. Intersection over Union (IOU) is shown in FIG. 16, that is, a ratio between the overlapping region 161 of a dark region and the unified region 162 in FIG. 16.

9) Relationship between the UVD coordinate and the XYZ coordinate: the relationship between the UVD coordinate and the XYZ coordinate adopts the following formula (2-1) to convert UVD to XYZ:

$$x = \frac{(u - C_x) * d}{f_x}, y = \frac{(v - C_y) * d}{f_y}, z = d; \qquad (2-1)$$

Here, (x, y, z) is a coordinate of XYZ format, (u, v, d) is a coordinate of UVD format, u and v correspond to the pixel value of two-dimensional image, and d represents the depth value, that is, the depth value of the coordinate point from the camera. Cx and Cy represent a main point. The main point should ideally be located in a center of the image. The main point is an optical center of the camera and is generally located in the center of the image in the image coordinate system. And, fx and fy are focal lengths in the X and Y directions, respectively.

10) Classification and regression: classification prediction modeling problem is different from regression prediction modeling problem. Classification is a task of predicting a discrete class label. Regression is a task of predicting continuous quantities.

There is some overlap between classification and regression algorithms. For example, the classification algorithm can predict continuous values, but the continuous values appear in a form of class label probability. Regression algorithm can predict a discrete value, but the discrete value exists in a form of integer.

11) Convolutional neural network (CNN): the convolutional neural network is composed of an input layer, an output layer and a plurality of hidden layers. The plurality of hidden layers of CNN are usually composed of a series of convolution layers. The series of convolution layers are convoluted by multiplication or other dot products. An activation function is usually a RELU layer, followed by additional convolution layers, such as a pooling layer, a full connection layer and a normalization layer. Because inputs and outputs of the additional convolution layers are masked by the activation function and the final convolution, the additional convolution layers are called hidden layer. The final convolution, in turn, usually includes back propagation in order to calculate weight of the final product more accurately. Although these layers are often referred to as convolution, this is only a convention. Mathematically speaking, it is a sliding point product or cross correlation. This is important for index in a matrix because it affects how to determine a weight at a specific index point.

Convolution layer: when the CNN is designed, each convolution layer in the neural network should have following attributes: an input is a tensor, and a shape of the input is (the number of images)×(image width)×(image height)×(image depth). Width and height are super parameters, and the depth must be equal to a convolution kernel of the image depth. The convolution layer convolutes the input and passes a result to the next layer. This is similar to response of neurons in a visual cortex to specific stimuli.

Each convolution neuron processes data only for receiving domain of the convolution neuron. Although a fully connected feedforward neural network can be used for feature learning and data classification, it is not practical to apply this structure to the image. Even in shallow (as opposed to deep) structures, a very large number of neurons are required because an input size associated with the image is very large, and each pixel is a related variable. For example, for a (small) image with a size of 100×100, a full connection layer has 10000 weights for each neuron in a second layer. Convolution solves this problem because convolution reduces the number of free parameters, so that the network can go deeper with fewer parameters. For example, regardless of the image size, a flat area with a size of 5×5 has a same shared weight, and only 25 learnable parameters are required. Through this method, a problem of gradient disappearance or explosion in raining of traditional multilayer neural networks is solved by the method of back propagation.

Pooling layer: convolutional neural network can include local or global pooling layer to simplify calculation of a bottom layer. The pooling layer reduces dimension of data by combining output of one layer of neuron cluster into a single neuron of a next layer. A local pool combines small clusters usually with a size of 2×2. A global pool is used for all neurons in the convolution layer. In addition, a pool can calculate a maximum or an average value. A maximum pool uses the maximum value of each neuron cluster in a previous layer. An average pool uses the average value of each neuron cluster in the previous layer.

Full connection layer: the full connection layer connects each neuron in one layer to each neuron in another layer. In principle, the full connection layer is the same as a traditional multi-layer perceptron neural network (MLP). A flat matrix classifies images by a full connected layer.

Figure 17:
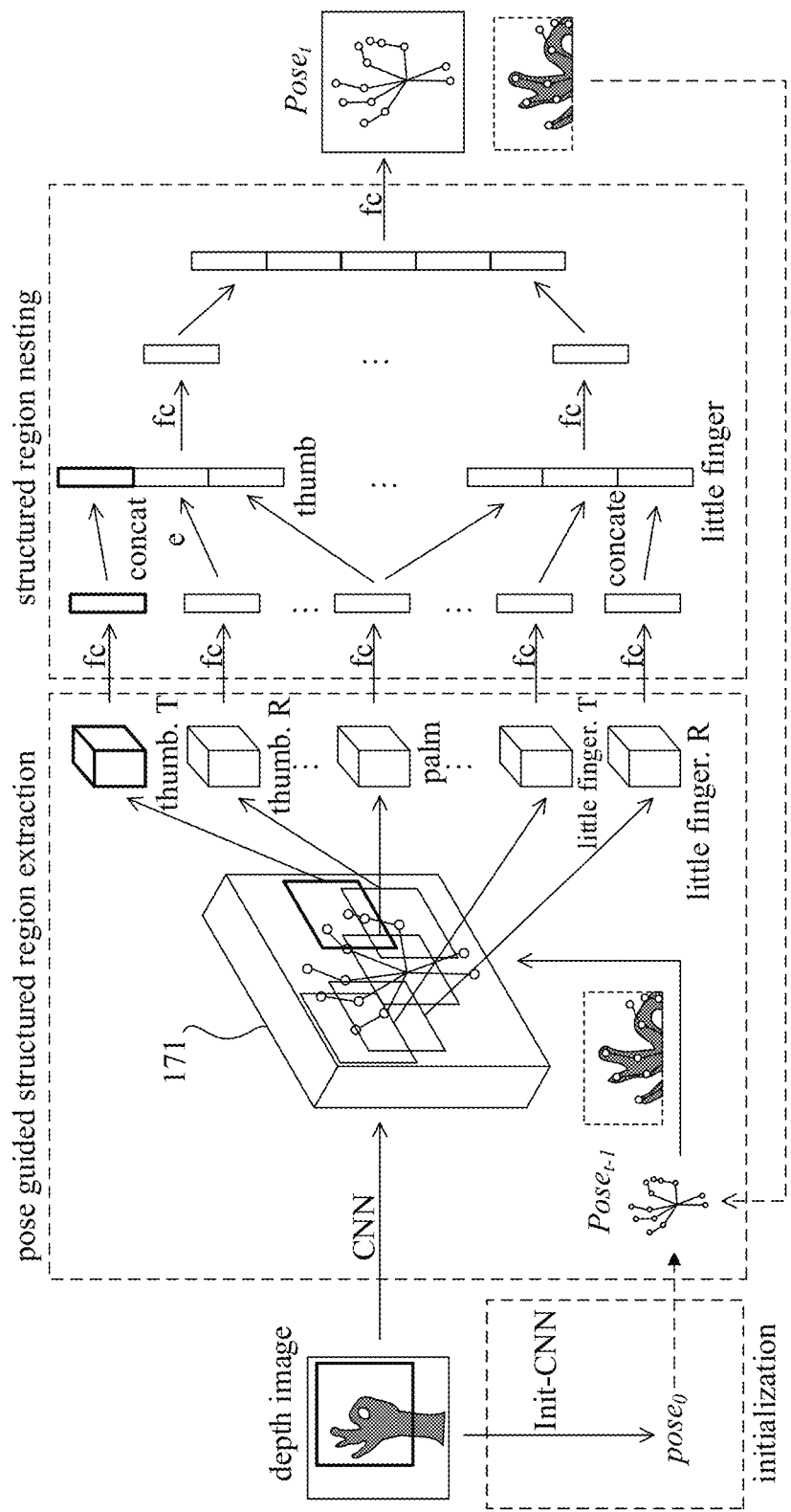
FIG. 17 is a schematic diagram of framework of pose guided structured region integration network provided by some embodiments of the present disclosure.

The gesture analysis method provided by the embodiments of the present disclosure is similar to work of Pose-REN. A framework of pose guided structured region integration network (Pose-REN) is shown in FIG. 17. A simple CNN network (represented by Init-CNN in the figure) is configured to predict an initial hand posture pose0 (used as initialization of a cascade structure). Under guidance of $pose_{t-1}$, a feature region is extracted from a feature diagram 171 generated by CNN, and hierarchical fusion is performed by a tree structure. $Pose_t$ is a refined hand posture obtained by Pose-REN and will be used as a guide for a next stage. And fc in the figure represents the full connection layer, and concate in the figure represents a combined array, which is used to connect two or more arrays.

The method of the embodiments of the present disclosure belongs to category of using the full connection layer as a last layer of Pose-REN to regress coordinates. However, firstly, the RoI features is stared rather than the original image. Secondly, an architecture of regression head is different (that is, in addition to a final regression layer, the convolution layer is mainly used rather than the full connection layer). Finally, UVD coordinates are returned instead of XYZ coordinates.

Figure 18:
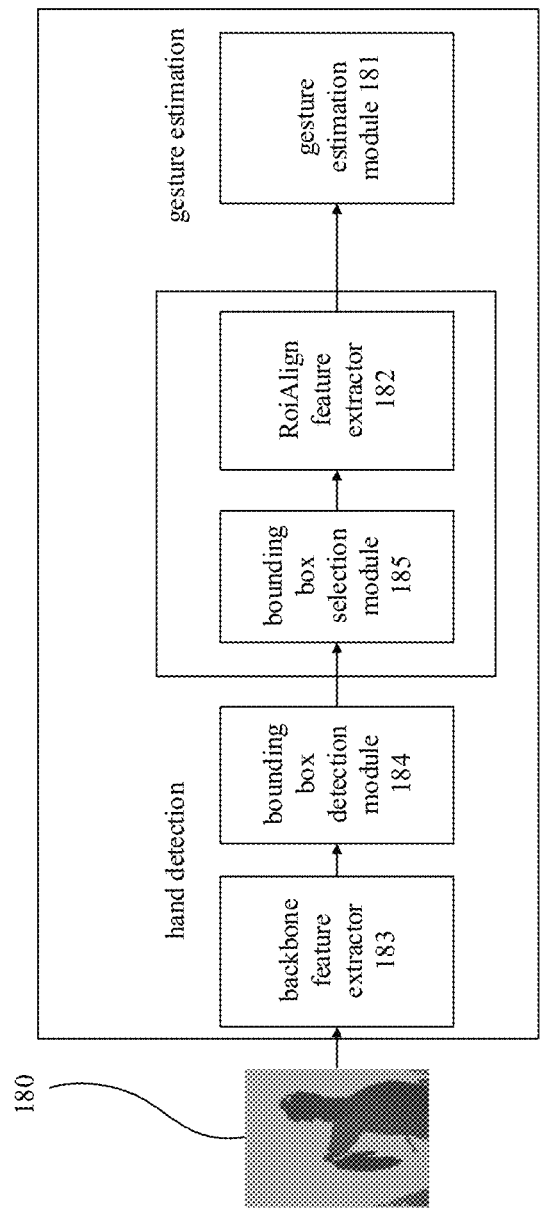
FIG. 18 is a flowchart of a gesture analysis method provided by some embodiments of the present disclosure.

Main invention of the embodiments of the present disclosure is placed behind the RoiAlign feature extractor, and is a regression module for a three-dimensional hand posture estimation task. A proposed regression module reuses the feature diagram obtained from a hand detection task, and starts from the RoiAlign feature diagram rather than the original image. A position of the method of the embodiments of the present disclosure is shown in FIG. 18. A gesture estimation module 181 configured to realize gesture analysis is located behind the RoiAlign feature extractor 182. The backbone feature extractor 183 is configured to extract backbone features on the input initial image 180. A bounding box detection module 184 is configured to bound box detection of the initial image. A bounding box selection module 185 is configured to select the bounding box. After selecting the bounding box, the RoiAlign feature extractor 182 is configured to extract RoiAlign features.

Figure 19:
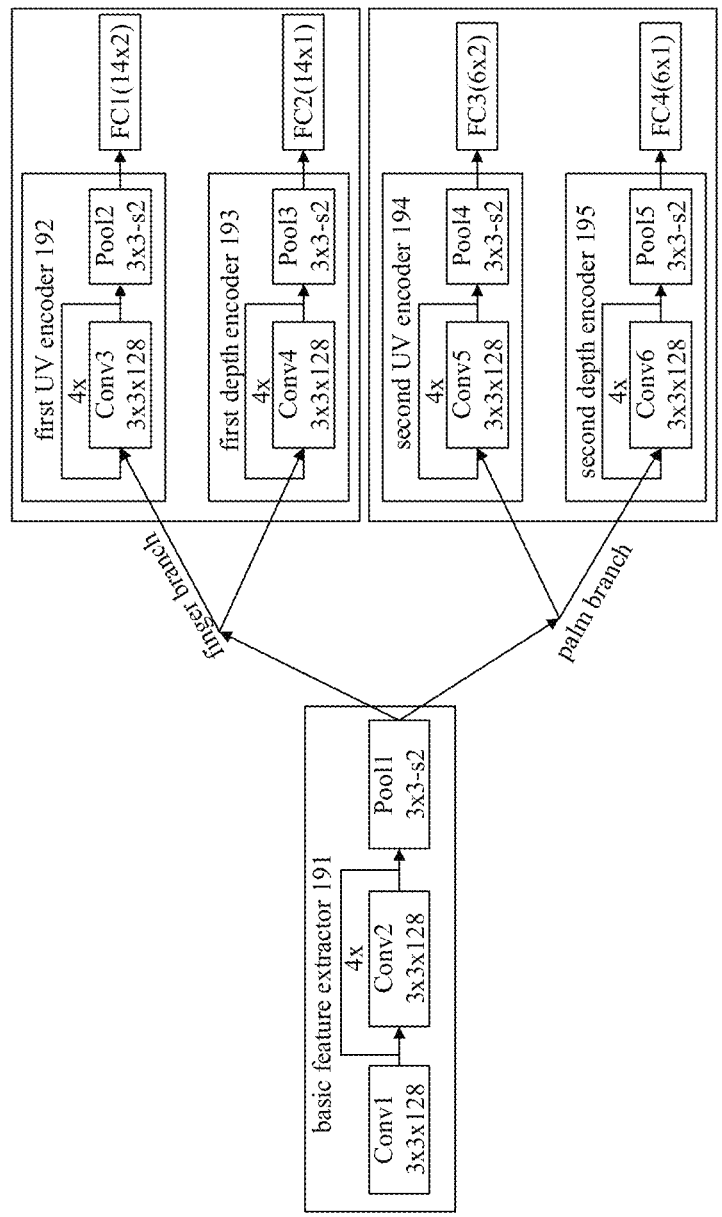
FIG. 19 is a network architecture diagram of a gesture estimation module provided by some embodiments of the present disclosure.

Based on the position of the gesture estimation module 181 in the whole framework shown in FIG. 18, FIG. 19 is a network architecture diagram of the gesture estimation module 181 provided by the embodiments of the present disclosure. As shown in FIG. 19, the whole network system includes a basic feature extractor 191, a first UV encoder 192, a first depth encoder 193, a second UV encoder 194 and a second depth encoder 195.

The basic feature extractor 191 is configured to extract key point features on an image feature diagram with a size of 7×7×256 (height*width*channel). Firstly, the image feature diagram applies a convolution layer Conv1 with a size of 3×3×128 to reduce a size of channel from 256 to 128 (i.e. save calculation). A feature diagram with a size of 7×7×128 is convoluted with the convolution layer conv2 (3×3×128) to further extract basic key point features, and Conv2 has skip connection. An input of Conv2 and an output of Conv2 are added, and the Conv2 and its skip connection are repeated for 4 times. Then, for a key point feature mapping with a size of 7×7×128, the pool layer with a size of 3×3 of kernel is used, namely Pool1, to sample down twice, with a size of 3×3×128.

In the embodiments of the present disclosure, the gesture estimation module 181 is divided into two branches: a finger branch and a palm branch. The finger branch is provided with 14 key points, while the palm is provided with 6 key points. FIG. 11 shows the gesture key points and palm key points. The finger key points are 0, 1, 2, 4, 5, 6, 8, 9, 10, 12, 13, 14, 16 and 17, and the palm key points are 3, 7, 11, 15, 18 and 19.

In the finger branch, the first UV encoder 192 is configured to extract key point features for UV coordinate regression. The first UV encoder 192 is configured to input the key point feature diagram with a size of 3×3×128, the convolution layer Conv3 is configured to output the key point feature diagram with a same size. The input of Conv3 and the input of Conv3 are added through the skip connection. This Conv3 is repeated with the corresponding skip connection for 4 times. Then, through the pool layer with a size of 3×3 of kernel, namely Pool2, the key point feature mapping with a size of 3×3×128 is sampled down twice, with a size of 1×1×128.

In the finger branch, the full connection layer FC1 is configured to restore UV coordinates of 14 key points.

In the finger branch, the first depth encoder 193 is configured to extract key point features for depth regression. The first depth encoder 193 is configured to input the key point feature diagram with a size of 3×3×128, the convolution layer Conv4 is configured to output the key point feature diagram with a same size. The input of Conv4 and the output of Conv4 are added through the skip connection. This Conv4 is repeated with the corresponding skip connection for 4 times. Then, through the pool layer with the size of 3×3 of kernel, namely Pool3, the key point feature mapping with the size of 3×3×128 is sampled down twice, with the size of 1×1×128.

In the finger branch, the full connection layer FC2 is configured to return depth coordinates of 14 key points.

In the palm branch, the second UV encoder 194 is configured to extract key point features for the UV coordinate regression. The second UV encoder 194 is configured to input the key point feature diagram with the size of 3×3×128, and the convolution layer Conv5 is configured to output the key point feature diagram with a same size. An input of Conv5 and an output of Conv5 through the skip connection. This Conv5 is repeated with the corresponding skip connection for 4 times. Then, through the pool layer with the size of 3×3 of kernel, namely Pool4, the key point feature mapping with the size of 3×3×128 is sampled down twice, with the size of 1×1×128.

In the palm branch, the full connection layer FC3 is configured to regress the UV coordinates of 6 key points.

In the palm branch, the second depth encoder 195 is configured to extract key point features for depth regression. The second depth encoder 195 is configured to input the key point feature diagram with the size of 3×3×128, the convolution layer Conv6 is configured to output the key point feature diagram with a same size. An input of conv6 and an output of Conv6 are added through the skip connection. This Conv6 is repeated with the corresponding skip connection for 4 times. Then, through the pool layer with the size of 3×3 kernel, namely Pool5, the key point feature mapping with a size of 3×3×128 is sampled down twice, with the size of 1×1×128.

In the palm branch, the full connection layer FC4 is configured to return the depth coordinates of the 6 key points.

Through the above calculation, the UVD coordinate of each of the finger key points and the UVD coordinate of each of the palm key points are obtained respectively. Then, the UV coordinate plus the depth is configured to calculate the XYZ coordinate, that is, the UVD coordinate is transformed into XYZ coordinate, that is, the estimation of the hand gesture is completed.

Based on the foregoing embodiments, some embodiments of the present disclosure provides a gesture analysis device. The gesture analysis device includes a plurality of modules and units included in each of the plurality of modules, and can be realized by a processor in a receiving terminal, of course, can also be realized through a specific logic circuit. In a process of implementation, the processor can be a central processing unit (CPU), a microprocessor (MPU), a digital signal processor (DSP) or a field programmable gate array (FPGA).

Figure 20:
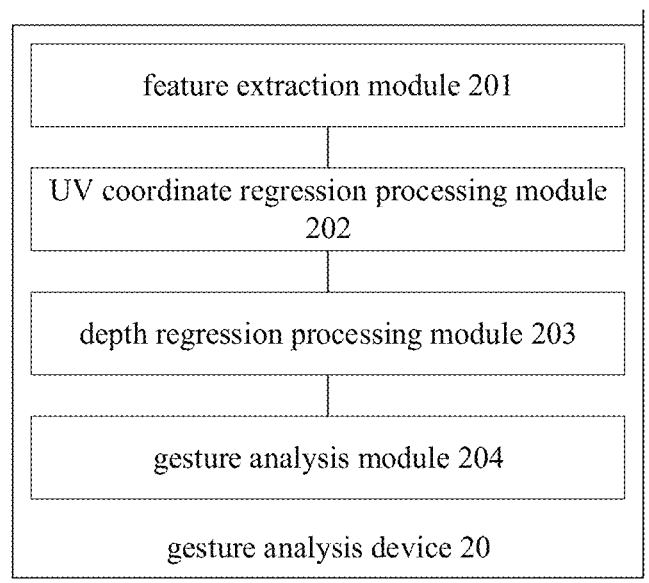
FIG. 20 is a structural diagram of a gesture analysis device provided by some embodiments of the present disclosure.

FIG. 20 is a structural diagram of the gesture analysis device provided by some embodiments of the present disclosure. As shown in FIG. 20, the gesture analysis device 20 includes a feature extraction module 201, a UV coordinate regression processing module 202, a depth regression processing module 203 and a gesture analysis module 204.

The feature extraction module 201 is configured to perform a feature extraction process on an image and obtain a first amount of features of finger key points and the second amount of features of palm key points.

The UV coordinate regression processing module 202 is configured to perform a UV-coordinate regression process on each of the features of finger key points and each of the features of palm key points respectively and obtain a first UV coordinate of each of the finger key points and a second UV coordinate of each of the palm key points.

The depth regression processing module 203 is configured to perform a depth regression process on each of the features of the finger key points and each of the features of the palm key points respectively and obtain a first depth coordinate of each of the finger key points and a second depth coordinate of each of the palm key points.

The gesture analysis module 204 is configured to perform a gesture analysis on the image according to the first UV coordinate of each of the finger key points, the first depth coordinate of each of the finger key points, the second UV coordinate of each of the palm key points and the second depth coordinate of each of the palm key points, and obtain the gesture analysis result.

In some embodiments, the UV coordinate regression processing module is also configured to perform UV coding processing on each of the features of the finger key points and each of the features of the palm key points respectively and correspondingly obtain a first UV coding feature of each of the finger key points and a second UV coding feature of each of the palm key points, perform a full connection process on the first UV coding feature of each of the finger key points and the second UV coding feature of each of the palm key points respectively and correspondingly obtain a first UV coordinate of each of the finger key points and a second UV coordinates of each of the palm key points.

In some embodiments, the UV coordinate regression processing module is also configured to perform a convoluting process on each of the features of the finger key points by a first convolution layer, and obtaining a first convolution feature of each of the finger key points, successively perform skip connection processes on the first convolution feature of each of the finger key points for a first preset amount of times by the first convolution layer, and obtain a first skip connection feature of each of the finger key points, perform a pooling process on the first skip connection feature of each of the finger key points, reducing a spatial size of the first skip connection feature thereof, and obtaining the first UV coding feature of each of the finger key points.

In some embodiments, the UV coordinate regression processing module is also configured to determine the first convolution feature as an input feature of the first convolution layer in a first skip connection process, and determine an output feature of the first convolution layer at a N-th time as an input feature of the first convolution layer at a (N+1)-th skip connection process, wherein N is an integer greater than 1, and input the input feature determined at each time into the first convolution layer, and successively performing the skip connection processes for the first preset amount of times, and obtain the first skip connection feature.

In some embodiments, the UV coordinate regression processing module is also configured to perform a convoluting process on each of the features of the palm key points by a second convolution layer, and obtain a second convolution feature of each of the palm key points, perform skip connection processes on the second convolution feature of each of the palm key points for a second preset amount of times by the second convolution layer, and obtain a second skip connection feature of each of the palm key points, perform a pooling process the second skip connection feature of each of the palm key points, reducing a spatial size of the second skip connection feature thereof, and obtaining the second UV coding feature of each of the palm key points.

In some embodiments, the depth regression processing module is also configured to perform depth coding process on each of the features of the finger key points and each of the features of the palm key points respectively and obtain a first depth coding feature of each of the finger key points and a second depth coding feature of each of the palm key points, perform a full connection process on the first depth coding feature of each of the finger key points and the second depth coding feature of each of the palm key points respectively, and obtain the first depth coordinate of each of the finger key points and the second depth coordinate of each of the palm key points.

In some embodiments, the deep regression processing module is also configured to perform a convoluting process on each of the features of the finger key points by a third convolution layer, and obtain a third convolution feature of each of the finger key points, perform skip connection processes on the third convolution feature of each of the finger key points for a third preset amount of times by the third convolution layer, and obtain a third skip connection feature of each of the finger key points, perform a pooling process on the third skip connection feature of each of the finger key points, reducing a spatial size of the third skip connection feature thereof, and obtaining the first depth coding feature of each of the finger key points.

In some embodiments, the deep regression processing module is also configured to determine the third convolution feature as an input feature of the third convolution layer in a first skip connection process, and determine an output feature of the third convolution layer at a M-th time as an input feature of the third convolution layer at a (M+1)-th skip connection process, wherein M is an integer greater than 1, input the input feature determined at each time into the third convolution layer, and successively perform the skip connection processes for the third preset amount of times, and obtain the third skip connection feature.

In some embodiments, the deep regression processing module is also configured to perform a convoluting process on each of the features of the palm key points by a fourth convolution layer, and obtain a fourth convolution feature of each of the palm key points, perform skip connection processes on the fourth convolution feature of each of the palm key points for a fourth preset amount of times by the fourth convolution layer, and obtaining a fourth skip connection feature of each of the palm key points, perform a pooling process on the fourth skip connection feature of each of the palm key points, reduce a spatial size of the fourth skip connection feature thereof, and obtain the second depth coding feature of each of the palm key points.

In some embodiments, the gesture analysis module is also configured to perform a coordinate conversion on the first UV coordinate and the first depth coordinate of each of the finger key points, and obtain a first spatial coordinate of a corresponding one of the finger key points, perform another coordinate conversion on the second UV coordinate and the second depth coordinate of each of the palm key points, and obtaining a second spatial coordinate of a corresponding one of the palm key points, perform the gesture analysis on the image according to the first spatial coordinate of each of the finger key points and the second spatial coordinate of each of the palm key points, and obtaining the gesture analysis result.

In some embodiments, the gesture analysis module is also configured to determine a first relative positional relationship between every two of the finger key points and a second relative positional relationship between every two of the palm key points; successively connect the first amount of the finger key points and the second amount of the palm key points according to the first relative positional relationship between every two of the finger key points and the second relative positional relationship between every two of the palm key points, and form a hand key-point connection diagram, perform the gesture analysis on the image according to the hand key-point connection diagram, and obtaining the gesture analysis result.

In some embodiments, the feature extraction module is also configured to perform performing a target recognition process on the image, and recognizing a target sub-region with a target object in at least two sub-regions of the image, cut the target sub-region, and obtaining a cut image; perform the feature extraction process on the cut image, and obtain the first amount of the features of the finger key points and the second amount of the features of the palm key points.

In some embodiments, the feature extraction module is also configured to acquire a scanning frame with a preset size, wherein a size of the image is greater than the preset size, slide the scanning frame on the image, and determine a probability value that each of the sub-regions has the target object existing therein, and determine a sub-region with a highest probability value as the target sub-region.

In some embodiments, the feature extraction module is also configured to perform a ROI matching feature extraction on the cut image, and obtaining at least two image RoI matching features on pixel points whose coordinate are floating-point numbers; determine a RoI matching feature diagram according to the at least two image RoI matching features, a two-dimensional hand pose estimation on the RoI matching feature diagram, and determine the first amount of the features of the finger key points and the second amount of the features of the palm key points.

In some embodiments, the feature extraction module is also configured to perform a convoluting process on the image RoI matching features of the RoI matching feature diagram by a fifth convolution layer, and obtaining RoI matching convolution features; perform skip connection processes on the RoI matching convolution features by a sixth convolution layer for a fifth preset amount of times, and obtaining fifth skip connection features; and perform a pooling process on the fifth skip connection features, reduce a spatial size of the fifth skip connection features, and determine the first amount of the features of the finger key points and the second amount of the features of the palm key points.

In some embodiments, the device also includes a processing module configured to perform the feature extraction process, the UV-coordinate regression process, the depth regression process and the gesture analysis by a gesture analysis model, and obtain the gesture analysis result.

In some embodiments, the gesture analysis model is trained by the following operations: inputting a sample image into the gesture analysis model; performing a feature extraction process on the sample image by a hand-feature extraction network of the gesture analysis model, and obtaining a third amount of features of sample first key points and a fourth amount of features of sample second key points; performing a UV-coordinate regression process on each of the features of sample first key points and each of the features of sample second key points respectively by a UV-coordinate regression network of the gesture analysis model, and obtaining a first sample UV coordinate of each of sample finger key points and a second sample UV coordinate of each of sample palm key points; performing a depth regression process on each of the features of sample first key points and each of the features of sample second key points respectively by a depth regression network of the gesture analysis model, and obtaining a first sample depth coordinate of each of the sample finger key points and a second sample depth coordinate of each of the sample palm key points; performing the gesture analysis on the first sample UV coordinate of each of sample finger key points, the second sample UV coordinate of each of sample palm key points, the first sample depth coordinate of each of the sample finger key points and the second sample depth coordinate of each of the sample palm key points by a gesture analysis network of the gesture analysis model, and obtaining a sample gesture analysis results; inputting the sample gesture analysis result into a preset loss model, and obtaining a loss result; and modifying parameters of the hand-feature extraction network, the UV-coordinate regression network, the depth regression network and the gesture analysis network according to the loss result, and modifying the gesture analysis model.

It should be noted that the description of the device provided by the embodiments of the present disclosure is similar to the description of the above method provided by the embodiments. The device has similar beneficial effects to the method provided by the embodiments, so it will not be repeated. For the technical details not disclosed in the embodiments of the device, please refer to the description of the method provided by the embodiments of the present disclosure.

Some embodiments of the present disclosure provides a computer program product or a computer program. The computer program product or the computer program includes computer instructions stored in a computer-readable storage medium. A processor of a computer device reads the computer instructions from the computer-readable storage medium, and the processor executes the computer instructions to make the computer device execute the method described in the embodiments of the present disclosure.

Some embodiments of the present disclosure provides a storage medium storing executable instructions. The storage medium stores executable instructions. When the executable instructions are executed by the processor, the executable instructions will cause the processor to execute the method provided by some embodiments of the present disclosure, for example, the method shown in FIG. 2.

In some embodiments, the storage medium may be a computer-readable storage medium, such as a ferroelectric memory (FRAM), a read only memory (ROM), a programmable read only memory (PROM), an erasable programmable read only memory (EPROM), an electrically erasable programmable read only memory (EEPROM), a flash memory, a magnetic surface memory, an optical disk, a compact disk read only memory or other memories, or can also be various devices including one or any combination of the above memories.

In some embodiments, executable instructions may be written in any form of programming language (including compilation or interpretation language, or declarative or procedural language) by program, software, software module, script or code, and may be deployed in any form, including being deployed as a separate program or as a module, component, subroutines or other units suitable for use in the computing environment.

As an example, the executable instructions may, but do not necessarily correspond to files in the file system, may be stored as part of a file that holds other programs or data, for example, in one or more scripts in a hypertext markup language (HTML) document, in a single file dedicated to the discussed program, or in multiple collaborative documents (for example, files that store one or more modules, subroutines or code parts). As an example, the executable instructions may be deployed to be executed on one computing device, or on multiple computing devices located in one location, or on multiple computing devices distributed in multiple locations and interconnected by a communication network.

The above is only an embodiment of the present disclosure and is not used to limit the scope of protection of the present disclosure. Any modification, equivalent replacement and improvement made within the spirit and scope of the present disclosure are included in the protection scope of the present disclosure.

INDUSTRIAL APPLICABILITY

In the embodiments of the present disclosure, firstly, feature extraction is performed on the image and the first amount of features of first key points and the second amount of features of second key points are obtained. Then a UV-coordinate regression process is performed on each of the features of the first key points and each of the features of the second key points respectively and the first UV coordinate of each of the finger key points and the second UV coordinate of each of the palm key points are obtained. Depth regression processing is performed on each of the features of the first key points and each of the features of the second key points respectively and the first depth coordinate of each of the finger key points and the second depth coordinate of each of the palm key points are obtained. Finally, gesture analysis is performed on the image according to first UV coordinates, first depth coordinates, second UV coordinates and second depth coordinates to obtain the gesture analysis result. In this way, accuracy of gesture analysis can be greatly improved and the present disclosure has certain industrial practicability.

What is claimed is:

1. A gesture analysis method, comprising:
performing a feature extraction process on an image, and obtaining a first amount of features of finger key points and a second amount of features of palm key points;
performing a UV-coordinate regression process on each of the features of the finger key points and each of the features of the palm key points respectively, and correspondingly obtaining a first UV coordinate of each of the finger key points and a second UV coordinate of each of the palm key points respectively;
performing a depth regression process on each of the features of the finger key points and each of the features of the palm key points respectively, and correspondingly obtaining a first depth coordinate of each of the finger key points and a second depth coordinate of each of the palm key points respectively; and
performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result;
wherein the performing a feature extraction process on an image, and obtaining a first amount of features of finger key points and a second amount of features of palm key points, comprises:
performing a target recognition process on the image, and recognizing a target sub-region with a target object in at least two sub-regions of the image;
cutting the target sub-region, and obtaining a cut image; and
performing the feature extraction process on the cut image, and obtaining the first amount of the features of the finger key points and the second amount of the features of the palm key points;
wherein the performing the feature extraction process on the cut image, and obtaining the first amount of the features of the finger key points and the second amount of the features of the palm key points, comprises:
performing a ROI matching feature extraction on the cut image, and obtaining at least two image RoI matching features on pixel points whose coordinate are floating-point numbers;
determining a RoI matching feature diagram according to the at least two image RoI matching features; and
performing a two-dimensional hand pose estimation on the RoI matching feature diagram, and determining the first amount of the features of the finger key points and the second amount of the features of the palm key points.

2. The method as claimed in claim 1, wherein the performing a UV-coordinate regression process on each of the features of the finger key points and each of the features of the palm key points respectively and correspondingly obtaining a first UV coordinate of each of the finger key points and a second UV coordinate of each of the palm key points respectively, comprises:
performing a UV coding process on each of the features of the finger key points and each of the features of the palm key points respectively, and correspondingly obtaining a first UV coding feature of each of the finger key points and a second UV coding feature of each of the palm key points respectively; and
performing a full connection process on the first UV coding feature of each of the finger key points and the second UV coding feature of each of the palm key points respectively, and correspondingly obtaining a first UV coordinate of each of the finger key points and a second UV coordinate of each of the palm key points.

3. The method as claimed in claim 2, wherein the performing a UV coding process on each of the features of the finger key points, and obtaining a first UV coding feature of each of the finger key points, comprises:
performing a convoluting process on each of the features of the finger key points by a first convolution layer, and obtaining a first convolution feature of each of the finger key points;
successively performing skip connection processes on the first convolution feature of each of the finger key points for a first preset amount of times by the first convolution layer, and obtaining a first skip connection feature of each of the finger key points; and
performing a pooling process on the first skip connection feature of each of the finger key points, reducing a spatial size of the first skip connection feature thereof, and obtaining the first UV coding feature of each of the finger key points.

4. The method as claimed in claim 3, wherein the successively performing skip connection processes on the first convolution feature of each of the finger key points for a first preset amount of times by the first convolution layer, and obtaining a first skip connection feature of each of the finger key points, comprises:
determining the first convolution feature as an input feature of the first convolution layer in a first skip connection process; and
determining an output feature of the first convolution layer at a N-th time as an input feature of the first convolution layer at a (N+1)-th skip connection process, wherein N is an integer greater than 1; and
inputting the input feature determined at each time into the first convolution layer, and successively performing the skip connection processes for the first preset amount of times, and obtaining the first skip connection feature.

5. The method as claimed in claim 2, wherein the performing a UV coding process on each of the features of the palm key points, and obtaining a second UV coding feature of each of the palm key points, comprises:
performing a convoluting process on each of the features of the palm key points by a second convolution layer, and obtaining a second convolution feature of each of the palm key points;
successively performing skip connection processes on the second convolution feature of each of the palm key points for a second preset amount of times by the second convolution layer, and obtaining a second skip connection feature of each of the palm key points;
performing a pooling process the second skip connection feature of each of the palm key points, reducing a spatial size of the second skip connection feature thereof, and obtaining the second UV coding feature of each of the palm key points.

6. The method as claimed in claim 1, wherein the performing a depth regression process on each of the features of the finger key points and each of the features of the palm key points respectively, and correspondingly obtaining a first depth coordinate of each of the finger key points and a second depth coordinate of each of the palm key points respectively, comprises:
performing a depth coding process on each of the features of the finger key points and each of the features of the palm key points respectively, obtaining a first depth coding feature of each of the finger key points and a second depth coding feature of each of the palm key points; and
performing a full connection process on the first depth coding feature of each of the finger key points and the second depth coding feature of each of the palm key points respectively, and obtaining the first depth coordinate of each of the finger key points and the second depth coordinate of each of the palm key points.

7. The method as claimed in claim 6, wherein the performing a depth coding process on each of the features of the each of the finger key points point, obtaining a first depth coding feature of each of the finger key points, comprises:
performing a convoluting process on each of the features of the finger key points by a third convolution layer, and obtaining a third convolution feature of each of the finger key points;
performing skip connection processes on the third convolution feature of each of the finger key points for a third preset amount of times by the third convolution layer, and obtaining a third skip connection feature of each of the finger key points; and
performing a pooling process on the third skip connection feature of each of the finger key points, reducing a spatial size of the third skip connection feature thereof, and obtaining the first depth coding feature of each of the finger key points.

8. The method as claimed in claim 7, wherein the performing a pooling process on the third skip connection feature of each of the finger key points, reducing a spatial size of the third skip connection feature thereof, and obtaining the first depth coding feature of each of the finger key points, comprises:
determining the third convolution feature as an input feature of the third convolution layer in a first skip connection process;
determining an output feature of the third convolution layer at a M-th time as an input feature of the third convolution layer at a (M+1)-th skip connection process, wherein M is an integer greater than 1; and
inputting the input feature determined at each time into the third convolution layer, and successively performing the skip connection processes for the third preset amount of times, and obtaining the third skip connection feature.

9. The method as claimed in claim 6, wherein the performing a depth coding process on each of the features of the palm key points respectively, obtaining a second depth coding feature of each of the palm key points, comprises:
- performing a convoluting process on each of the features of the palm key points by a fourth convolution layer, and obtaining a fourth convolution feature of each of the palm key points;
- performing skip connection processes on the fourth convolution feature of each of the palm key points for a fourth preset amount of times by the fourth convolution layer, and obtaining a fourth skip connection feature of each of the palm key points; and
- performing a pooling process on the fourth skip connection feature of each of the palm key points, reducing a spatial size of the fourth skip connection feature thereof, and obtaining the second depth coding feature of each of the palm key points.

10. The method as claimed in claim 1, wherein the performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result, comprises:
- performing a coordinate conversion on the first UV coordinate and the first depth coordinate of each of the finger key points, and obtaining a first spatial coordinate of a corresponding one of the finger key points;
- performing another coordinate conversion on the second UV coordinate and the second depth coordinate of each of the palm key points, and obtaining a second spatial coordinate of a corresponding one of the palm key points; and
- performing the gesture analysis on the image according to the first spatial coordinate of each of the finger key points and the second spatial coordinate of each of the palm key points, and obtaining the gesture analysis result.

11. The method as claimed in claim 10, wherein the performing the gesture analysis on the image according to the first spatial coordinate of each of the finger key points and the second spatial coordinate of each of the palm key points, and obtaining the gesture analysis result, comprises:
- determining a first relative positional relationship between every two of the finger key points and a second relative positional relationship between every two of the palm key points;
- successively connecting the first amount of the finger key points and the second amount of the palm key points according to the first relative positional relationship between every two of the finger key points and the second relative positional relationship between every two of the palm key points, and forming a hand key-point connection diagram; and
- performing the gesture analysis on the image according to the hand key-point connection diagram, and obtaining the gesture analysis result.

12. The method as claimed in claim 1, wherein the performing a target recognition process on the image, and recognizing a target sub-region with a target object in at least two sub-regions of the image, comprises:
- acquiring a scanning frame with a preset size, wherein a size of the image is greater than the preset size;
- sliding the scanning frame on the image, and determining a probability value that each of the sub-regions has the target object existing therein; and
- determining a sub-region with a highest probability value as the target sub-region.

13. The method as claimed in claim 1, wherein the performing a two-dimensional hand pose estimation on the RoI matching feature diagram, and determining the first amount of the features of the finger key points and the second amount of the features of the palm key points, comprises:
- performing a convoluting process on the image RoI matching features of the RoI matching feature diagram by a fifth convolution layer, and obtaining RoI matching convolution features;
- performing skip connection processes on the RoI matching convolution features by a sixth convolution layer for a fifth preset amount of times, and obtaining fifth skip connection features;
- performing a pooling process on the fifth skip connection features, reducing a spatial size of the fifth skip connection features, and determining the first amount of the features of the finger key points and the second amount of the features of the palm key points.

14. The method as claimed in claim 1, further comprising:
- performing the feature extraction process, the UV-coordinate regression process, the depth regression process and the gesture analysis by a gesture analysis model, and obtaining the gesture analysis result.

15. The method as claimed in claim 14, wherein the gesture analysis model is trained by steps as follows:
- inputting a sample image into the gesture analysis model;
- performing a feature extraction process on the sample image by a hand-feature extraction network of the gesture analysis model, and obtaining a third amount of features of sample first key points and a fourth amount of features of sample second key points;
- performing a UV-coordinate regression process on each of the features of sample first key points and each of the features of sample second key points respectively by a UV-coordinate regression network of the gesture analysis model, and obtaining a first sample UV coordinate of each of sample finger key points and a second sample UV coordinate of each of sample palm key points;
- performing a depth regression process on each of the features of sample first key points and each of the features of sample second key points respectively by a depth regression network of the gesture analysis model, and obtaining a first sample depth coordinate of each of the sample finger key points and a second sample depth coordinate of each of the sample palm key points;
- performing the gesture analysis on the first sample UV coordinate of each of sample finger key points, the second sample UV coordinate of each of sample palm key points, the first sample depth coordinate of each of the sample finger key points and the second sample depth coordinate of each of the sample palm key points by a gesture analysis network of the gesture analysis model, and obtaining a sample gesture analysis results;
- inputting the sample gesture analysis result into a preset loss model, and obtaining a loss result; and
- modifying parameters of the hand-feature extraction network, the UV-coordinate regression network, the depth regression network and the gesture analysis network according to the loss result, and modifying the gesture analysis model.

16. A gesture analysis device, comprising:
- a memory for storing executable instructions, and a processor, that, when executing the executable instructions stored in the memory, is caused to perform:

performing a feature extraction process on an image, and obtaining a first amount of features of finger key points and a second amount of features of palm key points;
performing a UV-coordinate regression process on each of the features of the finger key points and each of the features of the palm key points respectively, and correspondingly obtaining a first UV coordinate of each of the finger key points and a second UV coordinate of each of the palm key points respectively;
performing a depth regression process on each of the features of the finger key points and each of the features of the palm key points respectively, and correspondingly obtaining a first depth coordinate of each of the finger key points and a second depth coordinate of each of the palm key points respectively; and
performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result;
wherein the performing a feature extraction process on an image, and obtaining a first amount of features of finger key points and a second amount of features of palm key points, comprises:
performing a target recognition process on the image, and recognizing a target sub-region with a target object in at least two sub-regions of the image;
cutting the target sub-region, and obtaining a cut image; and
performing the feature extraction process on the cut image, and obtaining the first amount of the features of the finger key points and the second amount of the features of the palm key points;
wherein the performing the feature extraction process on the cut image, and obtaining the first amount of the features of the finger key points and the second amount of the features of the palm key points, comprises:
performing a ROI matching feature extraction on the cut image, and obtaining at least two image RoI matching features on pixel points whose coordinate are floating-point numbers;
determining a RoI matching feature diagram according to the at least two image RoI matching features; and
performing a two-dimensional hand pose estimation on the RoI matching feature diagram, and determining the first amount of the features of the finger key points and the second amount of the features of the palm key points.

17. The device as claimed in claim 16, wherein in the performing a UV-coordinate regression process on each of the features of the finger key points and each of the features of the palm key points respectively and correspondingly obtaining a first UV coordinate of each of the finger key points and a second UV coordinate of each of the palm key points respectively, the processor is caused to perform:
performing a UV coding process on each of the features of the finger key points and each of the features of the palm key points respectively, and correspondingly obtaining a first UV coding feature of each of the finger key points and a second UV coding feature of each of the palm key points respectively; and
performing a full connection process on the first UV coding feature of each of the finger key points and the second UV coding feature of each of the palm key points respectively, and correspondingly obtaining a first UV coordinate of each of the finger key points and a second UV coordinate of each of the palm key point.

18. A non-transitory computer-readable storage medium storing executable instructions that when executed, causes a processor to execute the executable instructions to perform:
performing a feature extraction process on an image, and obtaining a first amount of features of finger key points and a second amount of features of palm key points;
performing a UV-coordinate regression process on each of the features of the finger key points and each of the features of the palm key points respectively, and correspondingly obtaining a first UV coordinate of each of the finger key points and a second UV coordinate of each of the palm key points respectively;
performing a depth regression process on each of the features of the finger key points and each of the features of the palm key points respectively, and correspondingly obtaining a first depth coordinate of each of the finger key points and a second depth coordinate of each of the palm key points respectively; and
performing a gesture analysis on the image according to the first UV coordinate of each of the finger key points, the first depth coordinate of each of the finger key points, the second UV coordinate of each of the palm key points and the second depth coordinate of each of the palm key points, and obtaining a gesture analysis result;
wherein the performing a feature extraction process on an image, and obtaining a first amount of features of finger key points and a second amount of features of palm key points, comprises:
performing a target recognition process on the image, and recognizing a target sub-region with a target object in at least two sub-regions of the image;
cutting the target sub-region, and obtaining a cut image; and
performing the feature extraction process on the cut image, and obtaining the first amount of the features of the finger key points and the second amount of the features of the palm key points;
wherein the performing the feature extraction process on the cut image, and obtaining the first amount of the features of the finger key points and the second amount of the features of the palm key points, comprises:
performing a ROI matching feature extraction on the cut image, and obtaining at least two image RoI matching features on pixel points whose coordinate are floating-point numbers;
determining a RoI matching feature diagram according to the at least two image RoI matching features; and
performing a two-dimensional hand pose estimation on the RoI matching feature diagram, and determining the first amount of the features of the finger key points and the second amount of the features of the palm key points.

* * * * *